US012792848B2

(12) United States Patent
Weisz et al.

(10) Patent No.: US 12,792,848 B2
(45) Date of Patent: Nov. 10, 2026

(54) EFFICIENT ALIGNMENT OF GENERATIVE RESPONSE(S) TO NATURAL LANGUAGE INPUT(S)

(71) Applicant: GOOGLE LLC, Mountain View, CA (US)

(72) Inventors: Ágoston Weisz, Zurich (CH); Igor Petrovski, Zurich (CH); Oscar Akerlund, Zurich (CH); Khyatti Gupta, Zurich (CH); Evgeny Sluzhaev, Zurich (CH); Oliver Wang, Seattle, WA (US); Jason Baldridge, Austin, TX (US); Benigno Uria, London (GB); Evgeny Gladchenko, London (GB)

(73) Assignee: GOOGLE LLC, Mountain View, CA (US)

( * ) Notice: Subject to any disclaimer, the term of this patent is extended or adjusted under 35 U.S.C. 154(b) by 174 days.

(21) Appl. No.: 18/940,263

(22) Filed: Nov. 7, 2024

(65) Prior Publication Data

US 2026/0127385 A1 May 7, 2026

(51) Int. Cl.

*G06F 40/40* (2020.01)
*G06T 11/00* (2006.01)

(52) U.S. Cl.

CPC .............. *G06F 40/40* (2020.01); *G06T 11/00* (2013.01)

(58) Field of Classification Search

None

See application file for complete search history.

(56) References Cited

U.S. PATENT DOCUMENTS

| | | | | |
|---|---|---|---|---|
| 11,947,923 | B1 | 4/2024 | Jain | |
| 2023/0135179 | A1* | 5/2023 | Mielke | G06N 5/022 704/232 |
| 2024/0193351 | A1 | 6/2024 | Benedetto et al. | |
| 2024/0289407 | A1 | 8/2024 | Rofouei | |
| 2025/0022100 | A1* | 1/2025 | Wu | G06T 11/00 |

OTHER PUBLICATIONS

European Patent Office, Communication issued in Applicaiton No. 25210899.8, 10 pages, dated Mar. 24, 2026.

(Continued)

*Primary Examiner* — Quynh H Nguyen
(74) *Attorney, Agent, or Firm* — Gray Ice Higdon

(57) ABSTRACT

Implementations relate to receiving natural language (NL) input associated with a client device; and generating response(s) to the NL input. Generating the response(s) includes: determining, based on the NL input, a base prompt; processing, using a first generative model (GM), first GM input to generate corresponding first GM output, the first GM input including the base prompt; determining, based on the first GM output, a plurality of extended prompts; obtaining, based on filtering the plurality of extended prompts, a subset of extended prompts; for each extended prompt of the subset: processing, using the first GM or a second GM, second GM input to generate corresponding second GM output, the second GM input including the respective extended prompt, and determining, based on the second GM output, a respective candidate response corresponding to the respective extended prompt; and obtaining, based on filtering the candidate response(s), the response(s) to the NL input.

20 Claims, 10 Drawing Sheets

(56) References Cited

OTHER PUBLICATIONS

Daniel Biran "LLM and Generative Al Suggested Contextually Relevant Images in a Conversation" Retrieved from https://www.tdcommons.org/dpubs_series/6253, 7 pages, dated Sep. 15, 2023.
Kim et al., "A Novel Scheme for Generating Context-Aware Images Using Generative Artificial Intelligence" IEEE. vol. 12, 13 pages, dated Mar. 4, 2024.
Datta et al., "Prompt Expansion for Adaptive Text-to-Image Generation" arXiv:2312.16720v1 [cs.CV] 63 pages, dated Dec. 27, 2023.
Qin et al., "Diffusion GPT: LLM-Driven Text-to-Image Generation System" arXiv:2401.1003v1v [cs.CV], 10 pages, dated Jan. 18, 2024.

* cited by examiner

EFFICIENT ALIGNMENT OF GENERATIVE RESPONSE(S) TO NATURAL LANGUAGE INPUT(S)

BACKGROUND

Various generative model(s) (GM(s)) have been proposed that can be used to process natural language (NL) content and/or other input(s), to generate output that reflects generative content that is responsive to the input(s). For example, large language models (LLM(s)) have been developed that can be used to process NL content and/or other input(s), to generate LLM output that reflects generative NL content and/or other generative content that is responsive to the input(s). As another example, image generation models have been developed that can be used to process NL content and/or other input(s), to generate visual outputs such as image data that is responsive to the input(s).

In some instances, GM(s) can be used to process NL input that is associated with a client device in order to generate response(s) that are responsive to the NL input (which, for example, could be rendered at the client device). However, the quality of these response(s) can be affected by the quality of the GM(s) used in generating them and the quality of the underlying training data used to train these GM(s). GM(s) are typically trained on enormous amounts of diverse data including data from, but not limited to, webpages, electronic books, software code, electronic news articles, and machine translation data. Accordingly, these GM(s) leverage the underlying data on which they were trained in performing various NL processing (NLP) tasks. Characteristics (e.g., accuracy, breadth, and/or quantity) of training data for GM(s) can lead to trained GM(s) which are unable to reliably provide high-quality response(s) to some kinds of NL input. For these and other reasons, it can be desirable to generate response(s) using techniques which maximize the ability of trained GM(s) to provide accurate, high-quality response(s) which are aligned with (e.g., successfully responsive to) NL input in a computationally efficient manner.

SUMMARY

Implementations described herein relate to efficient generation of response(s) to natural language (NL) input which are aligned with (e.g., successfully responsive to) the NL input. More particularly, but not exclusively, according to the techniques described herein, generative model(s) (GM(s)) can be used in determining generative response(s) to NL input (e.g., including a user query for completion of a generative task), and these generative response(s) can be determined accurately and efficiently (e.g., with respect to computational and network resources).

Processor(s) of a system can: receive NL input associated with a client device; and generate one or more responses that are responsive to the NL input. In other words, the system can be configured to receive an input including NL input (referred to herein as "free form NL input" interchangeably), e.g., from a user of the client device. The NL input may request completion of one or more generative tasks. The system can further be configured to generate one or more responses (e.g., one, two, four, eight or any fixed or variable number of responses) which are responsive to the NL input, for example by utilizing one or more GMs. As a specific example, the free form NL input may be a user query requesting a generative task of "Design a battery cell suitable for use in an electric vehicle", which could be received at a client device of the user. In this specific example, the system may utilize one or more GMs to generate one or more images (i.e., one or more responses) which illustrate possible battery cell designs (e.g., illustrating structure(s), dimension(s), material(s), etc.) suitable for use in an electric vehicle.

In generating the one or more responses that are responsive to the NL input, the processor(s) can further: determine, based on the NL input, a base prompt. In some scenarios, the NL input may include parameter(s) and/or variable(s) for one or more generative tasks, but may also contain other information which is not necessary or desirable for efficient processing of the NL input and/or efficient completion of the generative task(s). The base prompt may preserve these core parameter(s) and/or variable(s) for the generative task(s), whilst removing the extraneous or otherwise unnecessary parts of the NL input. Returning to the above example, where the NL input is to "Design a battery cell suitable for use in an electric vehicle", the base prompt may be a condensed (e.g., shortened) form of the NL input such as "Battery cell design for electric vehicle", or "Electric vehicle battery cell". Put another way, the base prompt may preserve at least the core parameters specifying that the generative task relates to designing a "battery cell" for an "electric vehicle", but may remove other aspects of the NL input, e.g., " . . . suitable for . . . " which are not necessary or desirable for efficiently processing the prompt using one or more GMs. It will be appreciated that the base prompt may take other forms which retain core parameters. In additional or alternative examples, the NL input be based on a plurality of user inputs, such as a first user input of "Design a battery cell" and a second, subsequent, user input of "Make it suitable for use in an electric vehicle". In these examples, again, the base prompt may preserve the core parameters specifying that the generative task relates to designing a "battery cell" for an "electric vehicle", but may remove other aspects of the NL input, e.g., "Make it suitable for . . . ".

In some examples, determining the base prompt from the NL input can be performed using one or more GMs (which may be the same as, or distinct from, or a component of the same overall end-to-end GM, as the other GM(s) and/or evaluation model(s) described herein). For example, a GM (e.g., an LLM) can be configured to receive an input including the NL input, and can be trained to process the input to provide output representative of a base prompt. It will be appreciated that a GM can be trained to do this in a variety of ways. For example, a GM can be trained based on a number of training instances, where each training instance includes a "base prompt-NL input" pair. These training instances can be human generated and/or synthetically generated. In this manner, the GM can be trained to identify the parameter(s) and/or variable(s) for generative task(s) requested in the NL input which should be retained in the base prompt. In other examples, determining the base prompt from the NL input can be performed using various non-generative text processing methods, including various rule-based and/or pattern-based methods.

In generating the one or more responses that are responsive to the NL input, the processor(s) can further: process, using a first GM (e.g., an LLM), first GM input to generate corresponding first GM output, the first GM input including the base prompt; and determine, based on the corresponding first GM output, a plurality of extended prompts. In other words, the first GM (which may be the same as, or distinct from, or a component of the same overall end-to-end GM, as the other GM(s) and/or evaluation model(s) described herein) can be configured to receive an input including the base prompt, and can be trained to process the input to provide output representative of a plurality of extended prompts (e.g., two, four, eight or any fixed or variable number of extended prompts). It will be appreciated that the first GM can be trained to do this in a variety of ways. For example, the first GM can be trained based on a number of training instances, where each training instance includes an "extended prompt(s)-base prompt" mapping. These training instances can be human generated and/or synthetically generated. In this manner, the first GM can be trained to generate suitable extended prompts for a given base prompt. In some scenarios, the base prompt may be missing parameter(s) which can be necessary or desirable for efficient completion of the generative task(s). The extended prompt(s) can be generated to 'fill in' these missing parameter(s), in order to enable computationally efficient completion of the generative task(s). Specifically, in some instances, the extended prompt(s) can be designed to resemble (e.g., linguistically, stylistically, structurally, etc.) training instances which were used to train one or more GMs which are used in completion of the generative task(s) (e.g., the first or second GM described herein).

Returning to the above example where, for instance, the base prompt is "Battery cell design for electric vehicle", the plurality of extended prompts generated using the first GM may include a first extended prompt of "battery cell design for a fast, high-performance sports car"; a second extended prompt of "battery cell design for a sustainable, long-range, commercial semi-truck"; a third extended prompt of "battery cell design for a lightweight, remote-controlled toy monster truck"; and a fourth extended prompt of "battery cell design for a fast-charging commuter e-bike".

In generating the one or more responses that are responsive to the NL input, the processor(s) can further: obtain, based on filtering the plurality of extended prompts, a subset of extended prompts. The plurality of extended prompts can be filtered, in some examples, to ensure that extended prompts which are not sufficiently aligned with, or which are not sufficiently faithful to the base prompt, are removed from the group of extended prompts before completion of the generative task(s) using the extended prompt(s). For example, this filtering can be performed using an evaluation model (which may be the same as, or distinct from, or a component of the same overall end-to-end GM, as the GM(s) and/or other evaluation model(s) described herein). The evaluation model can be used to calculate an alignment score for each extended prompt, where the alignment score rates how successfully the extended prompt aligns with (e.g., textually entails) the base prompt. By selecting only extended prompts with an alignment score equal to or above a particular threshold, for example, a subset of extended prompts which are sufficiently aligned with the base prompt can be obtained.

Returning to the above example, the subset of extended prompts may include the first extended prompt, the second extended prompt, and the fourth extended prompt, but not the third extended prompt. For example, an evaluation model may determine that the first, second, and fourth extended prompts successfully align with, or entail, the base prompt of "Battery cell design for electric vehicle" (e.g., their alignment scores are above a threshold alignment score), whereas the third extended prompt does not successfully align with, or entail, the base prompt (e.g., its alignment score is below the threshold alignment score). This may be because the third extended prompt of "battery cell design for a lightweight, remote-controlled toy monster truck" does not relate to an "electric vehicle" in the sense likely intended by the original user input, i.e., an electric vehicle for transporting passengers and/or goods.

In generating the one or more responses that are responsive to the NL input, and for each extended prompt of the subset of extended prompts, the processor(s) can further: process, using the first GM (e.g., where the first GM is a multi-modal, optionally end-to-end GM) or a second GM (e.g., an image generation model), second GM input to generate corresponding second GM output, the second GM input including the respective extended prompt, and determine, based on the corresponding second GM output, a respective candidate response corresponding to the respective extended prompt. In other words, the first GM or a second GM (which may be the same as, or distinct from, or a component of the same overall end-to-end GM, as the other GM(s) and/or evaluation model(s) described herein) can be configured to receive an input including a respective extended prompt, and can be trained to process the input to provide output representative of a candidate response (which is responsive to the specific respective extended prompt). It will be appreciated that the first or second GM can be trained to do this in a variety of ways. For example, the first or second GM can be trained based on a number of training instances, where each training instance includes a "candidate response-extended prompt" pair. These training instances can be human generated and/or synthetically generated. In this manner, the first or second GM can be trained to generate suitable a suitable candidate response for a given extended prompt.

Returning to the above example, a second GM which is an image generation GM may be used to generate an image (i.e., a candidate response) responsive to each of the extended prompts in the subset of extended prompts. For instance, the second GM may provide output representative of a first image (i.e., a first candidate response) which attempts to provide a suitable "battery cell design for a fast, high-performance sports car"; a second image (i.e., a second candidate response) which attempts to provide a suitable "battery cell design for a sustainable, long-range, commercial semi-truck"; and a third image (i.e., a third candidate response) which attempts to show a suitable "battery cell design for a fast-charging commuter e-bike".

In generating the one or more responses that are responsive to the NL input, the processor(s) can further: obtain, based on filtering the one or more candidate responses, the one or more responses that are responsive to the NL input. The candidate response(s) which have been generated can be filtered, in some examples, to ensure that any candidate responses which are not sufficiently aligned with or which are not sufficiently faithful to the base prompt and/or the corresponding respective extended prompt are removed from the group of candidate response(s) before e.g., outputting the 'final' response(s) which are responsive to the NL input. For example, this filtering can be performed using an evaluation model (which may be the same as, or distinct from, or a component of the same overall end-to-end GM, as the GM(s) and/or other evaluation model(s) described herein). The evaluation model can be used to calculate an entailment score for each candidate response, where the entailment score rates how successfully the candidate response aligns with (e.g., visually entails) the base prompt and/or the corresponding respective extended prompt. By selecting only candidate responses with an entailment score equal to or above a particular threshold, for example, a subset of the candidate responses which are sufficiently aligned with the base prompt and/or the corresponding respective extended prompt can be obtained as the final response(s) which are responsive to the NL input.

Returning to the above example, the one or more response(s) which are responsive to the NL input may include the first candidate response and the second candidate response, but not the third candidate response. For example, an evaluation model may determine that the first and second images successfully visually align with, or visually entail, the base prompt of "Battery cell design for electric vehicle" (e.g., their entailment scores are above a threshold entailment score), whereas the third image does not successfully visually align with, or visually entail, the base prompt (e.g., its entailment score is below the threshold entailment score). This may be because the third image which attempts to show a suitable "battery cell design for a fast-charging commuter e-bike" actually shows a diagram of a design for a commuter e-bike, rather than a battery cell design for said e-bike. For example, this kind of failure can arise when a GM used for completion of the generative task (e.g., the second GM in this example) is not trained on sufficient training data relating to e.g., battery cell designs for e-bikes.

At least one of the one or more responses (i.e., at least one of the two final images in this specific example) can optionally be rendered at a client device, e.g., the client device from which the NL input originated. For example, the image(s) can be rendered visually on a display of the client device. In some examples, multiple final responses can be sent to the client device and stored in a local cache or local memory of the client device. For example, this can allow a first response to be rendered at the client device (e.g., a response with the highest entailment score), and then responsive to a user input (e.g., requesting a different response), a second response to be rendered at the client device (e.g., a response with the next highest entailment score). The techniques described herein can thus allow a variety of successfully aligned, high-quality responses to be presented to a user at a client device with minimal latency, for example.

Whilst the above description is generally made with respect to the candidate responses and final responses being images, it will be appreciated that other examples are possible and contemplated herein. For example, the first or second GM can be configured to generate candidate response(s) in the form of video data (e.g., by using a second GM which is a video generation model), in the form of audio data (e.g., by using a second GM which is an audio generation model), and/or in the form of text data (e.g., by using a second GM which is an LLM), depending on the generative task requested by the NL input.

Using the techniques described herein may provide a variety of technical advantages. For instance, in many scenarios, the computational efficiency of performing generative task(s) can be improved by providing detailed and well-defined prompts to GM(s). As such, the process of generating a base prompt which removes extraneous information, and generating extended prompts which improve detail and definition, as described herein, may improve the computational efficiency of completing the generative task(s) (e.g., generating one or more images, etc.). Furthermore, in some scenarios, the extended prompts for the generative task can be designed to resemble (e.g., linguistically, stylistically, structurally, etc.) training instances which were used to train one or more GMs which are used in completion of the generative task (e.g., the first or second GM described herein). This can further improve the computational efficiency of completing the generative task. Specifically, by using the detailed and well-defined extended prompts for completing the generative task rather than, for instance, directly using the NL input or the base prompt, generating the response(s) (e.g., using the first or second GM) can require less processing power, less inference time, etc.

In some scenarios, multiple GMs can be utilized to implement the techniques described herein. For example, generating the plurality of extended prompts can be performed using a first GM (e.g., an LLM), filtering the extended prompts can be performed using a first evaluation model, generating the candidate response(s) can be performed using a second GM (e.g., an image generation model), filtering the candidate response(s) can be performed using a second evaluation model. Optionally, determining the base prompt can be performed using a third GM (e.g., an LLM). As specifically contemplated herein, alternative distributions of these and other steps between model(s) are possible, such as when some or all steps are implemented by an end-to-end GM. However, by distributing different steps between different model(s) to at least some extent, the techniques described herein can mitigate issues or faults with any one particular model or multiple models. For example, GM(s) can be trained on imperfect training data (e.g., with respect to the accuracy, breadth, and/or quantity of the training data), which can lead to generating low-quality responses, i.e., responses which are poorly aligned with corresponding input prompts in some instances. Using multiple models as part of the pipeline described herein can mitigate, or 'hedge', against imperfections, biases, or other failures of any one particular model or multiple models. As one specific example, the techniques described herein can be robust against imperfections in training data used to train the first GM by using a separate first evaluation model to filter the plurality of extended prompts generated using the first GM, e.g., ensuring that only extended prompt(s) which sufficiently entail, or align with, the base prompt are included in the subset of extended prompts.

Moreover, the filtering processes described herein can further save computing resources by ensuring that extended prompt(s) which fail to entail, or align with, the base prompt are removed from the pipeline before further computational resources are expended on processing them. This can prevent unsuccessful extended prompt(s) from being used to generate candidate response(s), saving computing resources (e.g., at the processor(s) which implement the first or second GM). The filtering processes described herein can also save computing resources by ensuring that candidate response(s) which fail to entail, or align with, the base prompt and/or their respective extended prompt are removed from the pipeline before the final response(s) are obtained. This can prevent unsuccessful candidate response(s) from e.g., being stored and/or transmitted to a client device for rendering, saving computing and/or network resources.

The above description is provided as an overview of some implementations of the present disclosure. Further description of those implementations, and other implementations, is provided below in more detail.

DETAILED DESCRIPTION OF THE DRAWINGS

Figure 1:
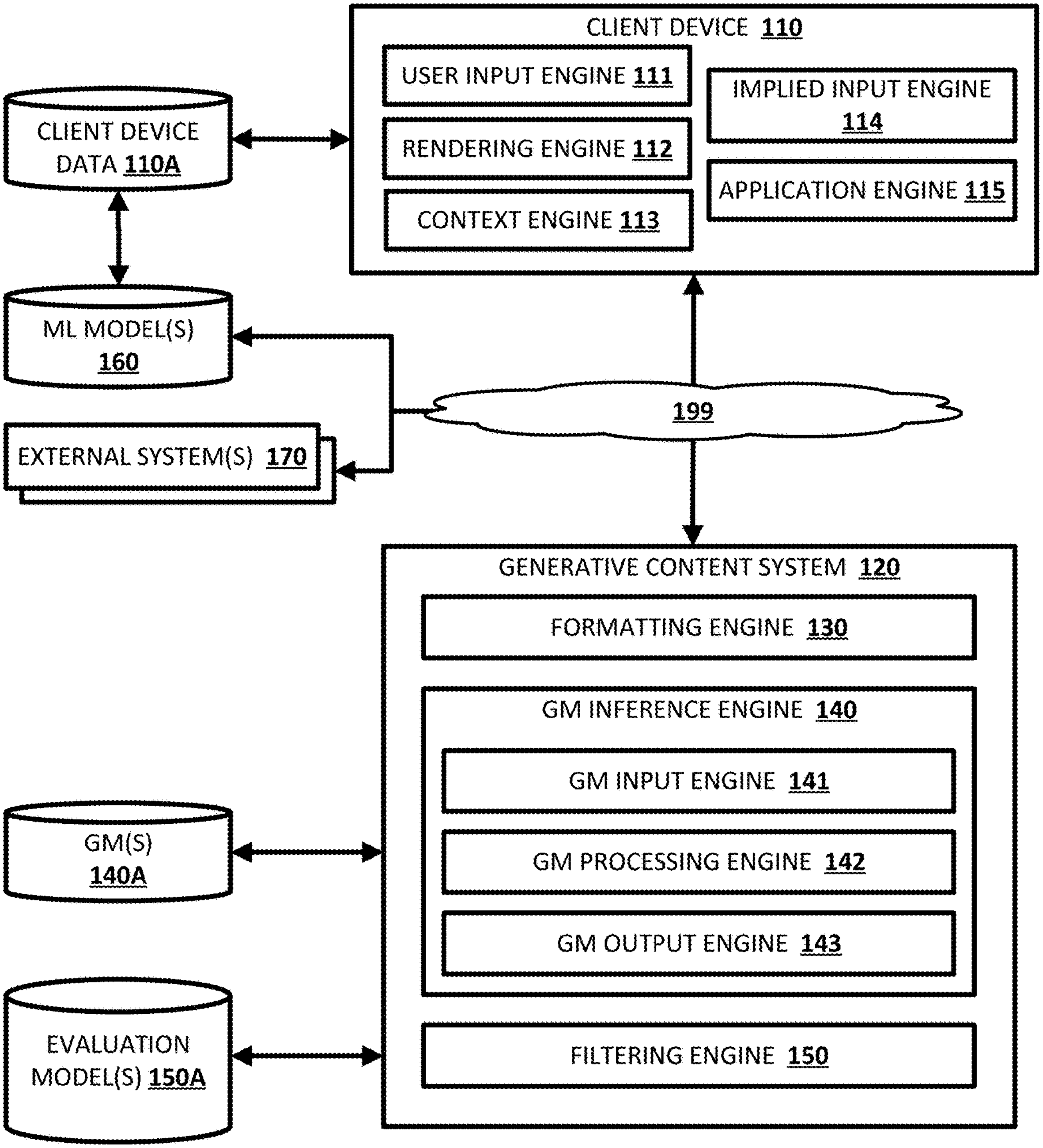
FIG. 1 depicts a block diagram of an example environment that demonstrates various aspects of the present disclosure, and in which some implementations disclosed herein can be implemented.

Turning now to FIG. 1, a block diagram of an example environment that demonstrates various aspects of the present disclosure, and in which implementations disclosed herein can be implemented is depicted. The example environment includes a client device 110 and a generative content system 120. In some implementations, all or aspects of the generative content system 120 can be implemented locally at the client device 110 (such that, for example, some or all of the processing performed by the generative content system 120 is local processing performed at the client device 110). In additional or alternative implementations, all or aspects of the generative content system 120 can be implemented remotely from the client device 110 as depicted in FIG. 1 (e.g., at remote server(s)). In those implementations, the client device 110 and the generative content system 120 can be communicatively coupled with each other via one or more networks 199, such as one or more wired or wireless local area networks ("LANs," including Wi-Fi®, mesh networks, Bluetooth®, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices can be provided.

The client device 110 can execute one or more software applications, via application engine 115, through which NL inputs, touch inputs, and/or other user inputs can be submitted and/or content that is responsive to the NL inputs, touch inputs, and/or the other user inputs can be rendered (e.g., visually and/or audibly). The application engine 115 can execute one or more software applications that are separate from an operating system of the client device 110 (e.g., one installed "on top" of the operating system)—or can alternatively be implemented directly by the operating system of the client device 110. For example, the application engine 115 can execute a web browser, generative image creator, or automated assistant installed on top of the operating system of the client device 110. As another example, the application engine 115 can execute a web browser software application, a generative image creator software application, or automated assistant software application that is integrated as part of the operating system of the client device 110. The application engine 115 (and the one or more software applications executed by the application engine 115) can interact with or otherwise provide access to (e.g., as a front-end) the generative content system 120.

In various implementations, the client device 110 can include a user input engine 111 that is configured to detect user input provided by a user of the client device 110 using one or more user interface input devices. For example, the client device 110 can be equipped with one or more microphones that capture audio data, such as audio data corresponding to spoken utterances of the user or other sounds in an environment of the client device 110. Additionally, or alternatively, the client device 110 can be equipped with one or more vision components that are configured to capture vision data corresponding to images and/or movements (e.g., gestures) detected in a field of view of one or more of the vision components. Additionally, or alternatively, the client device 110 can be equipped with one or more touch sensitive components (e.g., a keyboard and mouse, a stylus, a touch screen, a touch panel, one or more hardware buttons, etc.) that are configured to capture signal(s) corresponding to typed and/or touch inputs directed to the client device 110.

Some instances of NL input described herein can be a query for a response that is formulated based on user input provided by a user of the client device 110 and detected via user input engine 111. For example, the query can be a typed query that is typed via a physical or virtual keyboard, a suggested query that is selected via a touch screen or a mouse of the client device 110, a spoken voice query that is detected via microphone(s) of the client device 110 (and optionally directed to an automated assistant executing at least in part at the client device 110), or an image or video query that is based on vision data captured by vision component(s) of the client device 110 (or based on NL input generated based on processing the image using, for example, object detection model(s), captioning model(s), etc.). Other instances of NL input described herein can be a prompt for content that is formulated based on user input provided by a user of the client device 110 and detected via the user input engine 111. For example, the prompt can be a typed prompt that is typed via a physical or virtual keyboard, a suggested prompt that is selected via a touch screen or a mouse of the client device 110, a spoken prompt that is detected via microphone(s) of the client device 110, or an image or video prompt that is based on an image or video captured by a vision component of the client device 110.

In various implementations, the client device 110 can utilize one or more machine learning (ML) model(s) stored in ML model(s) database 160 to process the user input. For example, the user input received at the client device 110 can be a spoken utterance. In these examples, the user input engine 111 can process, using automatic speech recognition (ASR) model(s) stored in the ML model(s) database 160 (e.g., a recurrent neural network (RNN) model, a transformer model, and/or any other type of ML model capable of performing ASR), audio data that capture the spoken utterance and that is generated by microphone(s) of the client device 110 to generate ASR output. The ASR output can include, for example, speech hypotheses (e.g., term hypotheses and/or transcription hypotheses) that are predicted to correspond to the spoken utterance captured in the audio data, one or more corresponding predicted values (e.g., probabilities, log likelihoods, and/or other values) for each of the speech hypotheses, a plurality of phonemes that are predicted to correspond to the spoken utterance captured in the audio data, one or more corresponding predicted values (e.g., probabilities, log likelihoods, and/or other values) for each of the plurality of phonemes, and/or other ASR output. In these implementations, the user input engine 111 can select one or more of the speech hypotheses as recognized text that corresponds to the spoken utterance (e.g., based on the corresponding predicted values for each of the speech hypotheses), such as when the user input engine 111 utilizes an end-to-end ASR model. In other implementations, the user input engine 111 can select one or more of the predicted phonemes (e.g., based on the corresponding predicted values for each of the predicted phonemes), and determine recognized text that corresponds to the spoken utterance based on the one or more predicted phonemes that are selected, such as when the user input engine 111 utilizes an ASR model that is not end-to-end. In these implementations, the user input engine 111 can optionally employ additional mechanisms (e.g., a directed acyclic graph) to determine the recognized text that corresponds to the spoken utterance based on the one or more predicted phonemes that are selected.

Notably, although the ML model(s) stored in the ML model(s) database 160 are described above as being implemented locally by the client device 110, it should be understood that is for the sake of example and is not meant to be limiting. For instance, the audio data that captures the spoken utterance can additionally, or alternatively, be streamed to the generative content system 120, and the generative content system 120 can utilize the ASR model(s) stored in the ML model(s) database 160 (or separate cloud-based ASR model(s)) to generate the ASR output.

In various implementations, the client device 110 can include a rendering engine 112 that is configured to render content for visual and/or audible presentation to a user of the client device 110 using one or more user interface output devices. For example, the client device 110 can be equipped with a display or projector that enables the content to be rendered as visual content (e.g., image(s), video(s), etc.), and optionally along with other visual content (e.g., textual content), via the client device 110. Additionally, or alternatively, the client device 110 can be equipped with speaker(s) that enable the content to be rendered as audible content via the client device 110.

In various implementations, the client device 110 can include a context engine 113 that is configured to determine a client device context (e.g., current or recent context) of the client device 110 and/or a user context of a user of the client device 110 (or an active user of the client device 110 when the client device 110 is associated with multiple users). In some of those implementations, the context engine 113 can determine a context based on data stored in client device database 110A. The data stored in the client device database 110A can include, for example, client device data that characterizes current or recent interaction(s) of the client device 110 and/or a user of the client device 110, location data that characterizes a current or recent location(s) of the client device 110 and/or a geographical region associated with a user of the client device 110, user attribute data that characterizes one or more attributes of a user of the client device 110, user preference data that characterizes one or more preferences of a user of the client device 110, user profile data that characterizes a profile of a user of the client device 110, and/or any other data accessible to the context engine 113 via the client device 110A or otherwise.

For example, the context engine 113 can determine a current context based on a current state of a dialog session (e.g., considering one or more recent inputs provided by a user during the dialog session), profile data, and/or a current location of the client device 110. For instance, the context engine 113 can determine a current context of "visitor looking for upcoming events in Louisville, Kentucky" based on a recently issued query, profile data, and/or an anticipated future location of the client device 110 (e.g., based on recently booked hotel accommodations). As another example, the context engine 113 can determine a current context based on which software application is active in the foreground of the client device 110, a current or recent state of the active software application, and/or content currently or recently rendered by the active software application. A context determined by the context engine 113 can be utilized, for example, in supplementing or rewriting NL inputs that are received at the client device 110, in generating an implied NL input (e.g., an implied query or prompt formulated independent of any explicit NL input provided by a user of the client device 110), and/or in determining to submit an implied NL input and/or to render result(s) (e.g., responsive content) for an implied NL input.

In various implementations, the client device 110 can include an implied input engine 114 that is configured to: generate an implied NL input independent of any user explicit NL input provided by a user of the client device 110; submit an implied NL input, optionally independent of any user explicit NL input that requests submission of the NL input; and/or cause rendering of a response for the NL input, optionally independent of any explicit NL input that requests rendering of the response. For example, the implied input engine 114 can use one or more past or current contexts, from the context engine 113, in generating an implied NL input, determining to submit the implied NL input, and/or in determining to cause rendering of a response that is responsive to the implied NL input. For instance, the implied input engine 114 can automatically generate and automatically submit an implied query or implied prompt based on the one or more past or current contexts. Further, the implied input engine 114 can automatically push the response that is generated responsive to the implied query or implied prompt to cause them to be automatically rendered or can automatically push a notification of the response, such as a selectable notification that, when selected, causes rendering of the response. Additionally, or alternatively, the implied input engine 114 can submit respective implied NL input at regular or non-regular intervals, and cause respective responses to be automatically provided (or a notification thereof to be automatically provided).

Further, the client device 110 and/or the generative content system 120 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices can be in communication with the client device 110 (e.g., over the network(s) 199). As another example, a given client device can be utilized by multiple users in a shared setting (e.g., a group of users, a household, a workplace, a hotel, etc.).

The generative content system 120 is illustrated in FIG. 1 as including a formatting engine 130, a GM inference engine 140, and a filtering engine 150. Some of these engines can be combined and/or omitted in various implementations. Further, these engines can include various sub-engines. For instance, the GM inference engine 140 is illustrated in FIG. 1 as including a GM input engine 141, a GM processing engine 142, and a GM output engine 143. Similarly, some of these sub-engines can be combined and/or omitted in various implementations. Accordingly, it should be understood that the various engines and sub-engines of the generative content system 120 illustrated in FIG. 1 are not meant to be limiting.

Further, the generative content system 120 is illustrated in FIG. 1 as interfacing with various databases, such as GM(s) database 140A and evaluation model(s) database 150A. Although particular engines and/or sub-engines are depicted as having access to particular databases, it should be understood that is for the sake of example and is not meant to be limiting. For instance, in some implementations, each of the various engines and/or sub-engines of the generative content system 120 can have access to each of the various databases. Further, some of these databases can be combined and/or omitted in various implementations. Accordingly, it should be understood that the various databases interfacing with the generative content system 120 illustrated in FIG. 1 are not meant to be limiting.

Moreover, the generative content system 120 is illustrated in FIG. 1 as interfacing with other system(s), such as external system(s) 170. The external system(s) 170 can include, for example, search system(s) (e.g., text-based search system(s), image-based search system(s), video-based search system(s), etc.) and/or other generative system(s) (other text-based generative system(s), other image-based generative system(s), other video-based generative system(s), other audio-based generative system(s), etc.), such as any or all of the first, second, and third GMs, and/or the first and second evaluation models described herein. In some implementations, the external system(s) 170 are first-party system(s), whereas in other implementations, the external system(s) 170 are third-party system(s). As used herein, the term "first-party" or "first-party entity" refers to an entity that controls, develops, and/or maintains the generative content system 120, whereas the term "third-party" or "third-party entity" refers to an entity that is distinct from the entity that controls, develops, and/or maintains the generative content system 120.

As described in more detail herein (e.g., with respect to FIGS. 2, 3A-3B, and 4A-4E), the generative content system 120 can be utilized to generate one or more responses that are responsive to NL input associated with a client device (e.g., client device 110). Generating the one or more responses that are responsive to the NL input can include determining, based on the NL input, a base prompt. In some examples, determining the base prompt can be performed by the formatting engine 130, optionally using one or more GMs (e.g., from GM(s) database 140A). In other examples, determining the base prompt can be performed by the GM inference engine 140 using one or more GMs (e.g., from GM(s) database 140A). For example, formatting engine 130 or GM inference engine 140 can be used to 'format' the NL input as a base prompt, optionally utilizing a GM (e.g., one of the first, second, or third GMs described herein).

Generating the one or more responses that are responsive to the NL input can also include processing, using a first GM, first GM input to generate corresponding first GM output, the first GM input including the base prompt, and determining, based on the corresponding first GM output, a plurality of extended prompts. First GM input can be formatted and/or generated by the GM input engine 141 such that it is representative of the base prompt, and processing of the first GM input can be performed by the GM processing engine 142 using the first GM (e.g., from GM(s) database 140A). Determining the plurality of extended prompts based on the corresponding first GM output can be performed by the GM output engine 143.

Generating the one or more responses that are responsive to the NL input can also include filtering the plurality of extended prompts to obtain a subset of extended prompts. In some examples, filtering the plurality of extended prompts can be performed by filtering engine 150, optionally using one or more evaluation models (e.g., from evaluation model(s) database 150A). In other examples, filtering the plurality of extended prompts can be performed by the GM inference engine 140 using one or more GM(s) (e.g., from GM(s) database 140A) and/or one or more evaluation models (e.g., from evaluation model(s) database 150A). For example, filtering engine 150 or GM inference engine 140 can be used to 'filter' the plurality of extended prompts to obtain the subset of extended prompts, optionally utilizing an evaluation model (e.g., the first evaluation model described herein) or a GM (e.g., one of the first, second, or third GMs described herein).

Generating the one or more responses that are responsive to the NL input can also include, for each extended prompt of the subset of extended prompts, processing, using the first GM or a second GM, second GM input to generate corresponding second GM output, the second GM input including the respective extended prompt, and determining, based on the corresponding second GM output, a respective candidate response corresponding to the respective extended prompt. Second GM input can be formatted and/or generated by the GM input engine 141 such that it is representative of the respective extended prompt, and processing of the second GM input can be performed by the GM processing engine 142 using the first GM or the second GM (e.g., from GM(s) database 140A). Determining the respective candidate response based on the corresponding second GM output can be performed by the GM output engine 143.

In some implementations where the second GM input is processed using the second GM, the first GM and second GM can be components of a single end-to-end GM, e.g., a multi-modal end-to-end GM (which optionally further includes as components any or all of the third GM, first evaluation model and second evaluation model described herein). In some of these implementations, each of the multiple GM components can be jointly trained and/or fine-tuned in an end-to-end manner to perform respective parts of the methods described herein.

Generating the one or more responses that are responsive to the NL input can also include filtering the one or more candidate responses to obtain the one or more responses that are responsive to the NL input. In some examples, filtering the one or more candidate responses can be performed by the filtering engine 150, optionally using one or more evaluation models (e.g., from evaluation model(s) database 150A). In other examples, filtering the one or more candidate responses can be performed by the GM inference engine 140 using one or more GM(s) (e.g., from GM(s) database 140A) and/or one or more evaluation models (e.g., from evaluation model(s) database 150A). For example, filtering engine 150 or GM inference engine 140 can be used to 'filter' the one or more candidate responses to obtain the one or more responses that are responsive to the NL input optionally utilizing an evaluation model (e.g., the second evaluation model described herein) or a GM (e.g., one of the first, second, or third GMs described herein).

The first GM can be stored in the GM(s) database 140A, and can include any GM (e.g., Bard, Gemini, GPT, and/or any other GM, such as any other GM that is encoder-only based, decoder-only based, sequence-to-sequence based and that optionally includes an attention mechanism or other memory). In particular, the first GM may be a large language model (LLM). Notably, the GM(s) stored in the GM(s) database 140A can include billions of weights and/or parameters that are learned through initially training the GM on enormous amounts of diverse data. This enables these GM(s) to generate GM output as a probability distribution over a sequence of tokens as described herein. Further, in implementations using a second GM to process the second GM input, the second GM can also be stored in the GM model(s) database 140A (or can be stored remotely, e.g., at a remote server), and can include any GM (e.g., Imagen, DALL-E, Bard, Gemini, GPT, and/or any other GM, such as any other GM that is encoder-only based, decoder-only based, sequence-to-sequence based and that optionally includes an attention mechanism or other memory). In particular, the second GM may be an image generation model. Further, in implementations using a using a first evaluation model and/or a second evaluation model, the evaluation model(s) can be stored in the evaluation model(s) database 150A (or can be stored remotely, e.g., at a remote server), and can include any kind of generative evaluation model or non-generative evaluation model, including various machine-learned and/or transformer-based models. In particular, the first evaluation model may be a natural language inferencing model (e.g., a text-to-text entailment model), and the second evaluation model may be a visual natural language inferencing model (e.g., an image-to-text alignment model).

Figure 2:
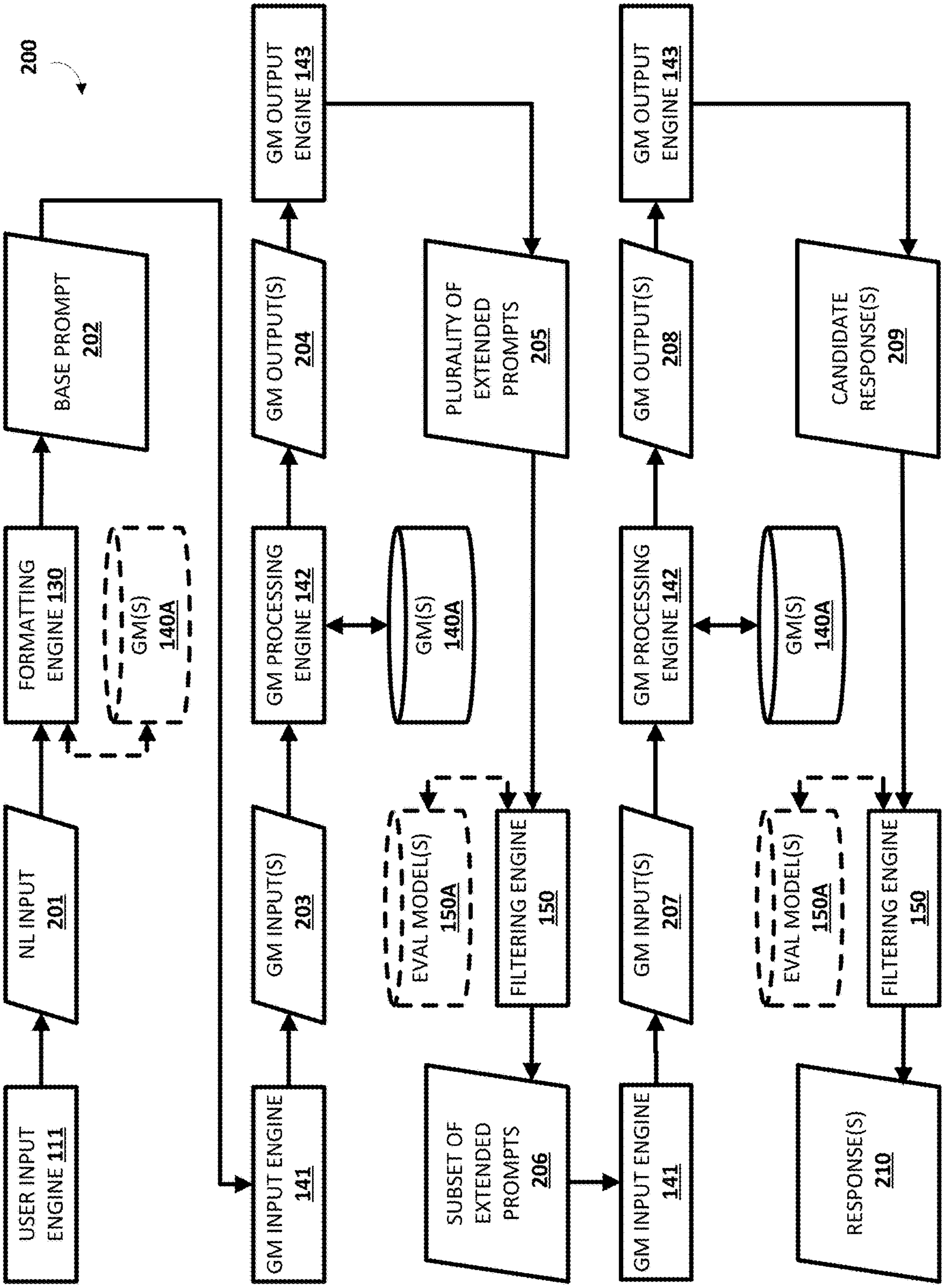
FIG. 2 depicts a process flow for utilizing various components from the example environment of FIG. 1, in accordance with various implementations.

Turning now to FIG. 2, a process flow for utilizing various components from the example environment of FIG. 1 is depicted. For the sake of example, assume that a user of the client device 110 provides a user input which is detected as NL input 201 via the user input engine 111. Although the process flow 200 of FIG. 2 is described with respect to the NL input 201 being an explicit NL input, it should be understood that this is for the sake of example and is not meant to be limiting. For instance, the NL input 201 can additionally, or alternatively, be implied NL input (e.g., as described with respect to the implied input engine 114).

The formatting engine 130 can process the NL input 201 to generate base prompt 202. For example, in generating the base prompt 202, the formatting engine 130 can utilize a GM such as the third GM described herein (e.g., stored in GM(s) database 140A). In other implementations (not shown in FIG. 2), the GM inference engine 140 can process the NL input 201 to generate base prompt 202 instead, utilizing a GM such as the third GM described herein (e.g., stored in GM(s) database 140A). In some scenarios, the formatting engine 130 (in combination with the engines of the client device 110) can iteratively update or replace the NL input responsive to requesting further information (e.g., clarification or other further input) from the user. For example, the formatting engine 130 may prompt the user to further specify or replace their initial NL input, and responsively received further user input can be used to update or replace the initial NL input to provide the NL input 201. The formatting engine 130 can be implemented as part of the generative content system 120 (as shown in FIG. 1), or in additional or alternative scenarios, can be implemented as part of one or more other systems, such as external system(s) 170, and/or client device 110.

The GM input engine 141 can process the base prompt 202 to generate GM input(s) 203. In generating the GM input(s) 203, the GM input engine 141 can utilize an explicitation GM (e.g., stored in the GM(s) database 140A). The explicitation GM can be one form of a GM that processes the base prompt 202 (and optionally context determined by the context engine 113 of the client device 110) to generate the GM input(s) 203. The GM input(s) 203 can then be provided to the GM processing engine 142 to generate GM output(s) 204, using one or more GM(s) from the GM(s) database 140A such as the first GM. Put another way, the GM input engine 141 can utilize an explicitation GM to process the raw base prompt 202 and put it in a structured form that is more suitable for processing by the GM processing engine 142. Further, the GM input engine 141 can utilize the explicitation GM to incorporate context into the GM input(s) and optionally any other prompts (e.g., a prompt to specify that a particular number of extended prompts should be generated, a prompt to specify a form, style, and/or length that the extended prompts should take, etc.) to aid the GM processing engine 142 in generating the GM output(s) 204.

The GM processing engine 142 can process, using one or more GM(s) from among the GM(s) database 140A (e.g., the first GM), the GM input(s) 203 to generate the GM output(s) 204. For example, the GM output(s) 204 can include a probability distribution over a sequence of tokens, such as words, phrases, or other semantic units that are predicted to be necessary for determining a plurality of extended prompts which e.g., add detail and definition to the base prompt. The one or more GM(s) (e.g., the first GM) can include millions or billions of weights and/or parameters that are learned through training and/or fine-tuning the GM(s) on enormous amounts of diverse data. This enables the GM(s) to generate the GM output(s) 204 as the probability distribution over the sequence of tokens.

Determining the plurality of extended prompts 205 can be performed at the GM output engine 143 based on the GM output(s) 204. The GM output engine 143, for example, can determine, based on the probability distribution over the sequence of tokens, each of the extended prompts to be included in the plurality of extended prompts 205.

The plurality of extended prompts 205 can then be provided to the filtering engine 150. The filtering engine 150 can process the plurality of extended prompts 205 to identify or generate the subset of extended prompts 206. For example, in filtering the plurality of extended prompts 205, the filtering engine 150 can utilize an evaluation model such as the first evaluation model described herein (e.g., stored in evaluation model(s) database 150A). In other implementations (not shown in FIG. 2), the GM inference engine 140 can filter the plurality of extended prompts 205 to identify or generate the subset of extended prompts 206 instead, utilizing a GM or an evaluation model such as the first evaluation model described herein (e.g., stored in evaluation model(s) database 150A).

As described herein, the filtering engine 150 can determine an entailment score for each extended prompt of the plurality of extended prompts 205, and identify the subset of extended prompts 206 based on these entailment scores (e.g., by selecting extended prompt(s) with the highest entailment scores, or by selecting extended prompt(s) with entailment scores above a threshold entailment score). The filtering engine 150 can be implemented as part of the generative content system 120 (as shown in FIG. 1), or in additional or alternative scenarios, can be implemented as part of one or more other systems, such as external system(s) 170, and/or client device 110.

The GM input engine 141 can process the subset of extended prompts 206 to generate GM input(s) 207. In generating the GM input(s) 207, the GM input engine 141 can utilize an explicitation GM (e.g., stored in the GM(s) database 140A). The explicitation GM can be one form of a GM that processes the subset of extended prompts 206 (and optionally context determined by the context engine 113 of the client device 110) to generate the GM input(s) 207. The GM input(s) 207 can then be provided to the GM processing engine 142 to generate GM output(s) 208, using one or more GM(s) from the GM(s) database 140A such as the second GM. Put another way, the GM input engine 141 can utilize an explicitation GM to process each of the raw extended prompts of the subset of extended prompts 206 and put them in structured form(s) that are more suitable for processing by the GM processing engine 142. Further, the GM input engine 141 can utilize the explicitation GM to incorporate context into the GM input(s) and optionally any other prompts (e.g., a prompt to specify a form, style, and/or file size that the candidate response(s) should take) to aid the GM processing engine 142 in generating the GM output(s) 208.

The GM processing engine 142 can process, using one or more GM(s) from among the GM(s) database 140A (e.g., the second GM), the GM input(s) 207 to generate the GM output(s) 208. For example, the GM output(s) 208 can include a probability distribution over a sequence of tokens, such as portions of text data (e.g., including words, phrases, or other semantic units), images, portions of video data, and/or portions of audio data. The one or more GM(s) (e.g., the second GM) can include millions or billions of weights and/or parameters that are learned through training and/or fine-tuning the GM(s) on enormous amounts of diverse data. This enables the GM(s) to generate the GM output(s) 208 as the probability distribution over the sequence of tokens.

Determining the one or more candidate responses 209 can be performed at the GM output engine 143 based on the GM output(s) 208. The GM output engine 143 can determine, based on the probability distribution over the sequence of tokens, a respective candidate response which is responsive to each respective extended prompt of the subset of extended prompts 206. Each of these respective candidate response(s) can form the one or more candidate responses 209.

The one or more candidate responses 209 can then be provided to the filtering engine 150. The filtering engine 150 can process the one or more candidate responses 209 to identify or generate the one or more final responses 210 which are responsive to the NL input 201. For example, in filtering the one or more candidate responses, the filtering engine 150 can utilize an evaluation model such as the second evaluation model described herein (e.g., stored in evaluation model(s) database 150A). In other implementations (not shown in FIG. 2), the GM inference engine 140 can filter the one or more candidate responses 209 to identify or generate the one or more final responses 210 which are responsive to the NL input 201 instead, utilizing a GM or an evaluation model such as the second evaluation model described herein (e.g., stored in evaluation model(s) database 150A).

As described herein, the filtering engine 150 can determine an alignment score for each candidate response of the one or more candidate responses, and identify the one or more final responses based on these alignment scores (e.g., by selecting candidate response(s) with the highest alignment scores, or by selecting candidate response(s) with alignment scores above a threshold alignment score). In some scenarios, further filtering processes can be performed by the filtering engine 150. For example, additional filtering processes for data security purposes (e.g., to ensure that the final responses 210 do not contain any personal and/or private information, such as face(s), name(s), personal detail (s), etc.) can be performed. The one or more final responses 210 can, for example, be provided to the client device 110, e.g., for rendering as output by rendering engine 112 and/or for local storage at the client device 110.

Figure 3A:
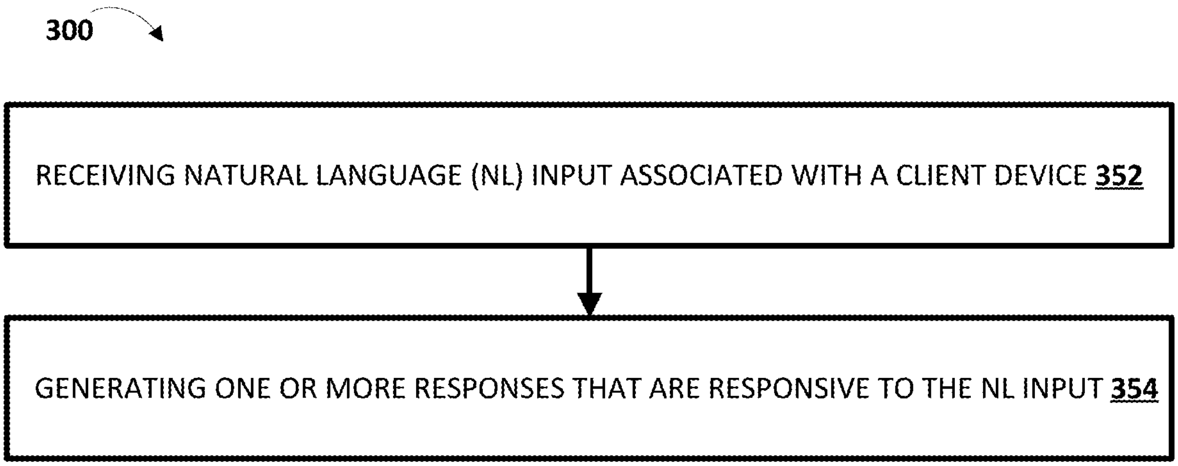
FIGS. 3A and 3B depict flowcharts which illustrate an example method of utilizing generative model(s) (GM(s)) to generate one or more responses that are responsive to natural language (NL) input, in accordance with various implementations.
Figure 3B:
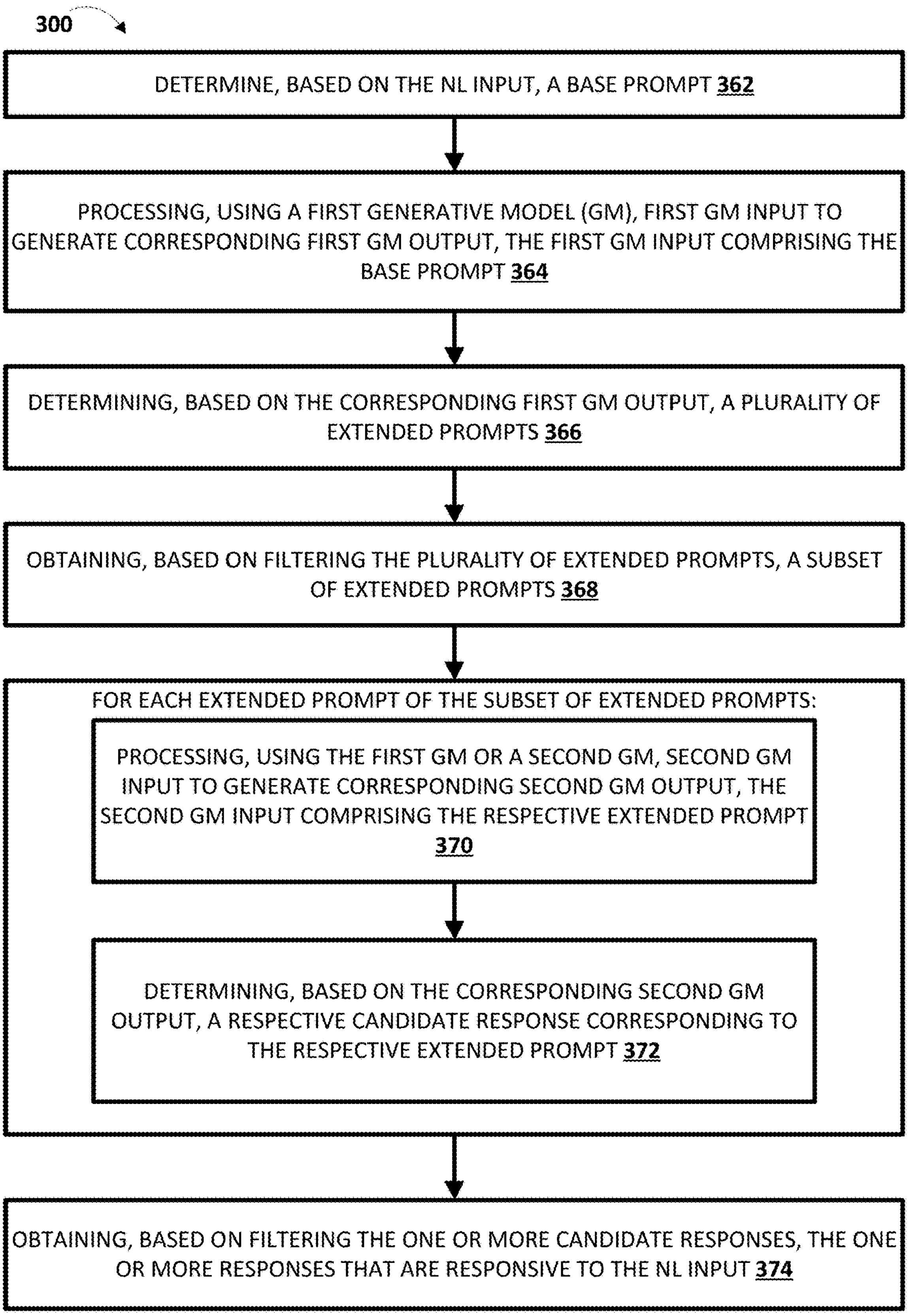

Turning now to FIGS. 3A and 3B, flowcharts illustrating an example method 300 of utilizing generative model(s) (GM(s)) to generate one or more responses that are responsive to natural language (NL) input are provided. For convenience, the operations of method 300 are described with reference to a system that performs the operations. This system of the method 300 includes one or more processors, memory, and/or other component(s) of computing device(s) (e.g., client device 110 of FIG. 1, generative content system 120 of FIG. 1, computing device 510 of FIG. 5, one or more servers, and/or other computing devices). Moreover, while operations of the method 300 are shown in a particular order, this is not meant to be limiting. One or more operations may be reordered, omitted, and/or added.

Referring specifically to FIG. 3A, at block 352, the system receives natural language (NL) input associated with a client device. As described with respect to the user input engine 111 of FIG. 1, free form NL input can be received through a variety of means. For example, the client device 110 can be equipped with one or more microphones that capture audio data, and the NL input can include a spoken utterance of a user captured in audio data by the one or more microphones. The NL input can request completion of one or more generative tasks.

At block 354, the system generates one or more responses (referred to herein as "final response(s)" interchangeably) that are responsive to the NL input. The techniques described herein can provide response(s) which are successfully aligned with the NL input (e.g., in that they successfully complete the generative task(s)). In some instances, at least one of these responses can be rendered as output (e.g., visually and/or audibly) at the client device 110, as described with respect to rendering engine 112. In some examples, these at least one rendered responses can be referred to as 'primary response(s)', i.e., response(s) which may be primarily rendered at a client device. Response(s) other than these primary response(s) can be referred to as 'secondary response(s)'. At least one of these secondary response(s) can be cached in a local memory of the client device. In response to an input from the user of the client device (e.g., indicating disapproval of the primary response(s), indicating that they would like an alternative response to be rendered, etc.), the system can cause at least one of the secondary response(s) to be rendered at the client device. This can allow alternative (i.e., secondary) response(s) to be rendered with minimal latency, e.g., as opposed to waiting for said user input before causing generation of alternative response(s), which may require time-consuming calls to and processing at remote server(s)).

Block 354, shown in FIG. 3A may include each of blocks 362, 364, 366, 368, 370, 372, and 374, shown in FIG. 3B, as sub-blocks. In other words, generating the one or more responses that are responsive to the NL input may include each of the steps set out in blocks 362-374, shown in FIG. 3B.

Referring specifically to FIG. 3B, at block 362, the system determines, based on the NL input, a base prompt. For example, the system can cause GM input (e.g., the third GM input described herein) including the NL input to be processed using a GM (e.g., any of the first, second or third GMs described herein) to generate corresponding GM output (e.g., the third GM output described herein). Based on this corresponding GM output, the system can determine the base prompt. In some instances, this processing can be performed using an LLM (i.e., the third GM can be an LLM, for example), allowing a text-form NL input to be condensed, compressed, shortened, or otherwise adapted to provide a text-form base prompt which removes aspects of the NL input unnecessary for further processing of the request for completion of the generative task(s). In some instances, the NL input may not need adapting (e.g., because it contains no extraneous information), and may be used directly as the base prompt.

At block 364, the system processes, using a first GM, first GM input to generate corresponding first GM output, the first GM input including the base prompt. At block 366, the system determines, based on the corresponding first GM output, a plurality of extended prompts. For example, the first GM can be an LLM, allowing a text-form base prompt to be enriched, embellished, extended, or otherwise adapted in multiple different ways to provide a plurality of text-form extended prompts which add further details, parameters, and/or variables to the base prompt. The system can prompt the first GM to generate a fixed or variable number, $N_1$, of extended prompts. This number of extended prompts, $N_1$, could vary, for example, based on computational constraints of the first GM which is used in generating the plurality of extended prompts, such as a token limit for the first GM, or a temporal constraint for the first GM, amongst other examples.

At block 368, the system obtains, based on filtering the plurality of extended prompts, a subset of extended prompts. For example, for each extended prompt of the plurality of extended prompts, the system can cause evaluation input (e.g., the first evaluation input described herein) including the respective extended prompt and the base prompt to be processed using an evaluation model (e.g., the first evaluation model described herein) to generate corresponding evaluation output (e.g., the first evaluation output described herein). Based on this corresponding evaluation output, the system can determine a respective entailment score corresponding to the respective extended prompt, which may provide a measure, or score, of how successfully the respective extended prompt entails, or is aligned with the base prompt. For instance, the first evaluation model can use natural language inferencing techniques to calculate these scores based on how successfully the extended prompts textually entail the base prompt.

Based on the respective entailment scores for each of the respective extended prompts of the plurality of extended prompts, the extended prompt(s) to be included in the subset of extended prompts can be determined. In some examples, a fixed number of extended prompt(s), $N_2$, with the highest-ranking respective entailment scores (e.g., a fixed number of the extended prompts which most successfully entail the base prompt) can be included in the subset of extended prompts. In other examples, only extended prompt(s) with a respective entailment score above a certain threshold entailment score (e.g., the extended prompts which achieve a particular objective degree of success in entailing the base prompt) can be included in the subset of extended prompts.

The system can repeat each of blocks 370 and 372 for each extended prompt of the subset of extended prompts. At block 370, the system processes, using the first GM or a second GM, second GM input to generate corresponding second GM output, the second GM input including the respective extended prompt. At block 372, the system determines, based on the corresponding second GM output, a respective candidate response corresponding to the respective extended prompt. In other words, the system can utilize either the first GM (e.g., where the first GM is a multi-modal GM) or a second GM in generating one or more candidate responses. Where a second GM is utilized, for example, the second GM can be an image generation model, allowing a text-form extended prompt to be used as a prompt for generating one or more images (i.e., one or more candidate responses) responsive to that prompt. The system can prompt the relevant GM to generate a single candidate response for each respective extended prompt, or can prompt the relevant GM to generate multiple candidate responses (e.g., with the number of candidate responses dependent on computational constraints of the relevant GM, such as a token limit for the GM, or a temporal constraint for the GM, amongst other examples). Where a second GM is utilized, in some examples, the second GM can be a video generation model, allowing a text-form extended prompt to be used as a prompt for generating one or more videos (e.g., each candidate response is a portion of video data); in some examples, the second GM can be an audio generation model, allowing a text-form extended prompt to be used as a prompt for generating one or more audio clips (e.g., each candidate response is a portion of audio data); and in some examples, the second GM can be an LLM, allowing a text-form extended prompt to be used as a prompt for generating one or more passages of text (e.g., each candidate response is a portion of text data).

At block 374, the system obtains, based on filtering the one or more candidate responses, the one or more responses that are responsive to the NL input. For example, for each candidate response of the one or more candidate responses, the system can cause evaluation input (e.g., the second evaluation input described herein) including the respective candidate response as well as the base prompt and/or the respective extended prompt to be processed using an evaluation model (e.g., the second evaluation model described herein) to generate corresponding evaluation output (e.g., the second evaluation output described herein). Based on this corresponding evaluation output, the system can determine a respective alignment score corresponding to the respective candidate response, which may provide a measure, or score, of how successfully the respective candidate response aligns with, or entails the base prompt and/or the respective extended prompt. In other words, in some instances, the respective alignment score can be a measure of how successfully the respective candidate response aligns with (e.g., is responsive to) the base prompt, in some instances, the respective alignment score can be a measure of how successfully the respective candidate response aligns with (e.g., is responsive to) the respective extended prompt, and in some instances the respective alignment score can be a measure of how successfully the respective candidate response aligns with (e.g., is responsive to) both the base prompt and the respective extended prompt. For instance, the second evaluation model can use visual natural language inferencing techniques to calculate these score(s) based on how successfully the image-based candidate response(s) align with the base prompt and/or their respective extended prompt(s).

Based on the respective alignment scores for each of the respective candidate response(s) of the one or more candidate responses, the candidate response(s) to be included in the final responses responsive to the NL input can be determined. In some examples, a fixed number of candidate response(s), $N_3$, with the highest-ranking respective alignment scores (e.g., a fixed number of the candidate responses which most successfully align with the base prompt and/or the respective extended prompt) can be included in the one or more final responses. In other examples, only candidate response(s) with a respective alignment score above a certain threshold alignment score (e.g., the candidate response(s) which achieve a particular objective degree of success in aligning with the base prompt and/or the respective extended prompt) can be included in one or more final responses.

Whilst this description is generally given with respect to a plurality of different models being utilized (e.g., a first GM being utilized in generating the plurality of extended prompts, a second GM being utilized in generating the candidate response(s), a third GM optionally being utilized in generating the base prompt, a first evaluation optionally being utilized in filtering the plurality of extended prompts, and a second evaluation model optionally being utilized in filtering the one or more candidate responses), it will be appreciated that other arrangements are possible and specifically contemplated herein. For instance, in some examples, the first GM (e.g., where the first GM is a multi-modal, optionally end-to-end GM) may be utilized in performing some or all of these steps. In some examples, any or all of the first GM, the second GM, the third GM, the first evaluation model, and the second evaluation model may be components of an end-to-end GM, which can be utilized in performing some or all of these steps. Also, whilst this description is generally given with respect to the various models being utilized by a single system (e.g., generative content system 120), in some examples, some or all of the models may be utilized by separate system(s), optionally remotely hosted system(s) (e.g., each model could be utilized by a separate (optionally generative) content system). For example, some or all of the models may be utilized by external system(s) 170.

Turning now to FIGS. 4A, 4B, 4C, 4D, and 4E, various non-limiting examples of utilizing generative model(s) (GM(s)) to generate one or more responses that are responsive to NL input are depicted. A client device 110 (e.g., the client device 110 from FIG. 1) may include various user interface components including, for example, microphone(s) to generate audio data based on spoken utterances and/or other audible input, speaker(s) to audibly render synthesized speech and/or other audible output, and/or a display 191 to visually render visual output. Further, the display 191 of the client device 110 can include various system interface elements 192, 193, and 194 (e.g., hardware and/or software interface elements) that may be interacted with by a user of the client device 110 to cause the client device 110 to perform one or more actions. The display 191 of the client device 110 enables the user to interact with content rendered on the display 191 by touch input (e.g., by directing user input to the display 191 or portions thereof (e.g., to a text entry box 195, to a keyboard (not depicted), or to other portions of the display 191)) and/or by spoken input (e.g., by selecting microphone interface element 196—or just by speaking without necessarily selecting the microphone interface element 196 (i.e., an automated assistant may monitor for one or more terms or phrases, gesture(s) gaze(s), mouth movement(s), lip movement(s), and/or other conditions to activate spoken input) at the client device 110). Although the client device 110 depicted in FIGS. 4A-4E is a mobile phone, it should be understood that is for the sake of example and is not meant to be limiting. For example, the client device 110 may be a standalone speaker with a display, a standalone speaker without a display, a home automation device, an in-vehicle system, a laptop, a desktop computer, and/or any other device capable of executing an automated assistant to engage in a human-to-computer dialog session with the user of the client device 110.

Figure 4A:
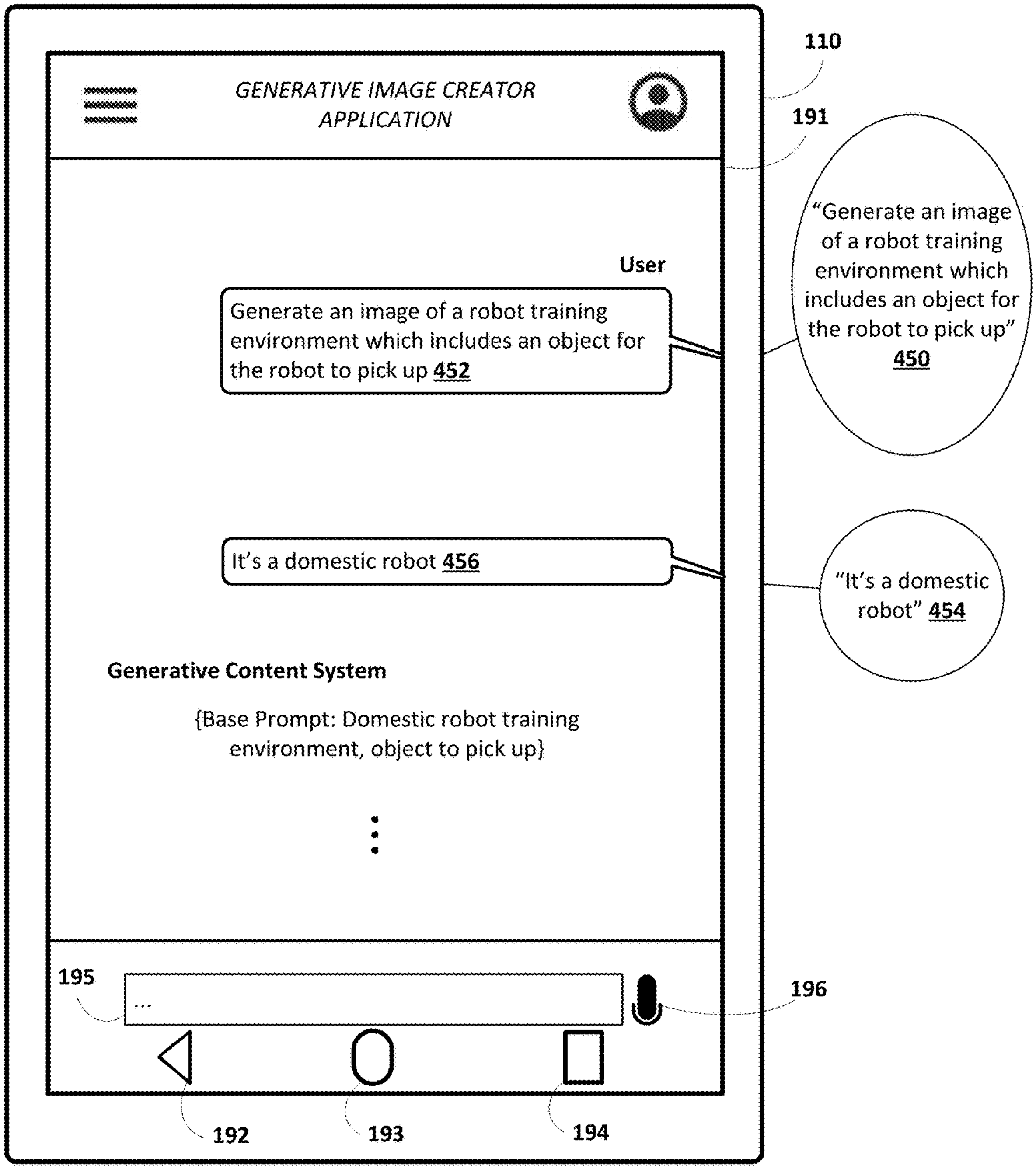
FIGS. 4A, 4B, 4C, 4D, and 4E depict various non-limiting examples of utilizing GM(s) to generate one or more responses that are responsive to NL input, in accordance with various implementations.

Referring specifically to FIG. 4A, assume that a user of the client device 110 accesses a generative image creator application, via the client device 110, that enables the user to interact with a generative content system (e.g., the generative content system 120 of FIG. 1). Further assume that the user provides free form NL input of "Generate an image of a robot training environment which includes an object for the robot to pick up" (NL input 452) by providing corresponding spoken utterance 450 and "It's a domestic robot" (NL input 456) by providing corresponding spoken utterance 454. In response to receiving the NL input 452 and 456, the generative content system can determine a base prompt of "Domestic robot training environment, object to pick up", for example using the formatting engine 130 and optionally the third GM described herein. This base prompt retains the core parameters of the NL input, e.g., that the user has requested generation of an image of a "robot training environment" for a "domestic robot", including an "object" for the robot to "pick up". However, the base prompt also removes extraneous information, e.g., "Generate an image of . . . ". Whilst this extraneous information can be used to determine e.g., that the generative content system should utilize an image generation model, it is not necessary or desirable to include as part of the prompt to the image generation model. It will be appreciated that, in various implementations, the base prompt is not rendered (e.g., visually and/or audibly) for presentation to the user at the client device, such that the base prompt is not perceivable to the user.

Figure 4B:
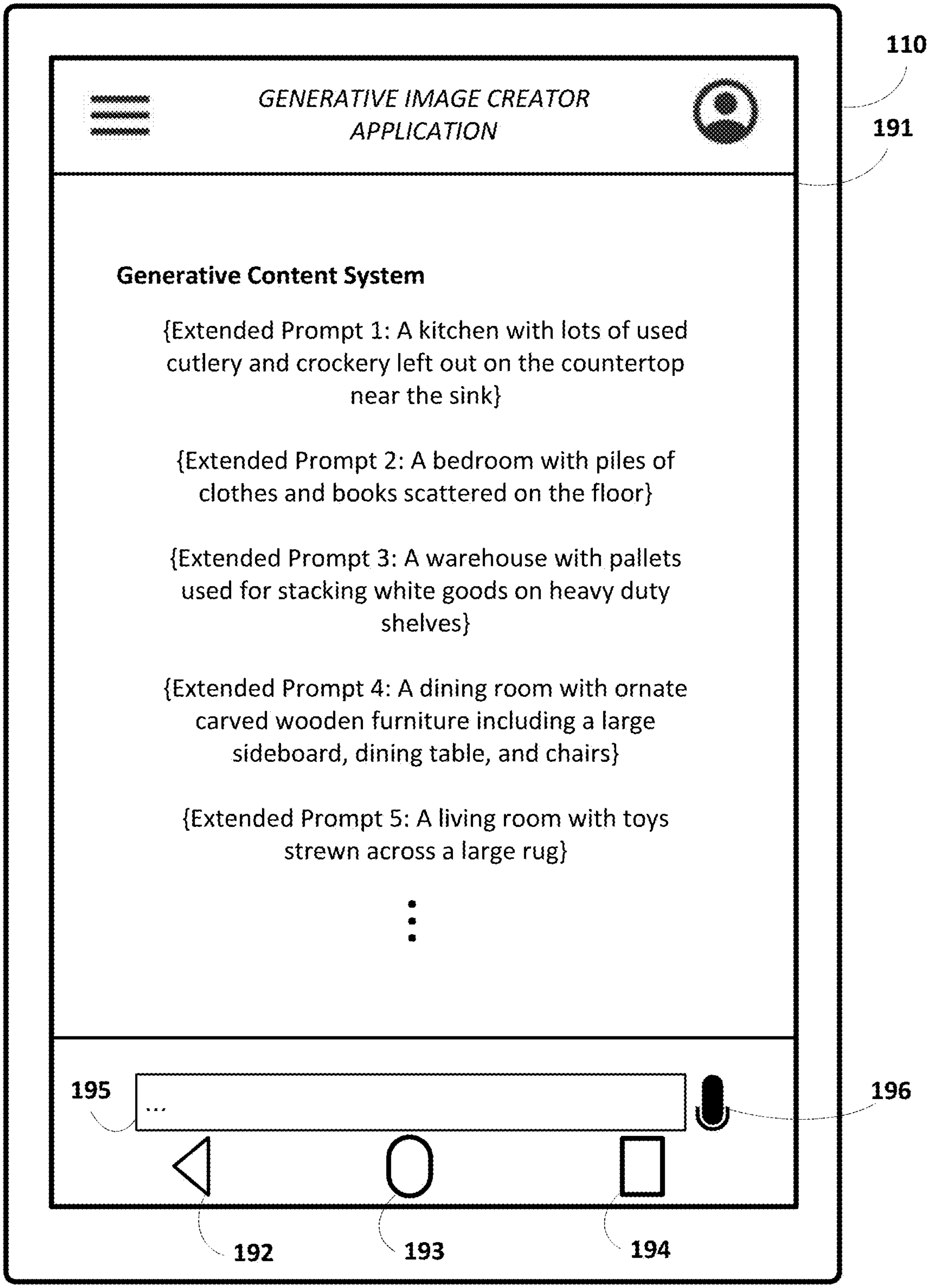

Referring specifically to FIG. 4B, the generative content system 120 can utilize an LLM (i.e., a first GM) to generate a number of extended prompts. For example, using the base prompt as a prompt, or as part of a prompt for the LLM, a first extended prompt of "A kitchen with lots of used cutlery and crockery left out on the countertop near the sink"; a second extended prompt of "A bedroom with piles of clothes and books scattered on the floor"; a third extended prompt of "A warehouse with pallets used for stacking white goods on heavy duty shelves"; a fourth extended prompt of "A dining room with ornate carved wooden furniture including a large sideboard, dining table, and chairs"; and a fifth extended prompt of "A living room with toys strewn across a large rug" may be generated. Each of these extended prompts adds detail and definition to the base prompt, which as described herein, can improve the computational efficiency of processing the prompts when generating images responsive to the prompts using an image generation model. For example, these extended prompts can be formatted to resemble prompts on which the image generation model was trained. It will be appreciated that, in various implementations, the extended prompts are not rendered (e.g., visually and/or audibly) for presentation to the user at the client device, such that the extended prompts are not perceivable to the user.

Figure 4C:
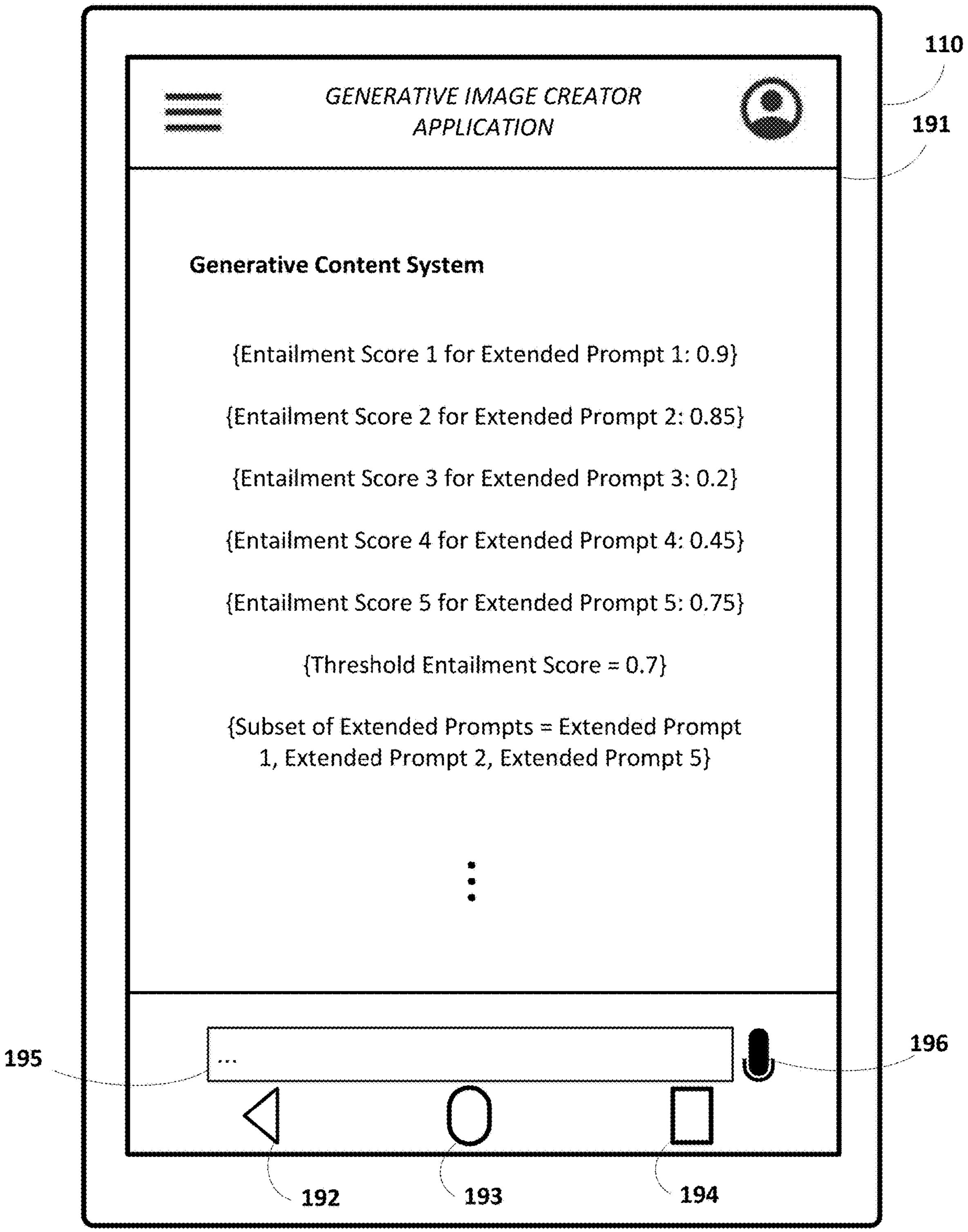

Referring specifically to FIG. 4C, the generative content system 120 can utilize a natural language inferencing model (e.g., a first evaluation model) to filter the five extended prompts. For example, the first evaluation model can calculate an entailment score for each of the extended prompts which scores how successfully the extended prompt entails the base prompt. For example, the first evaluation model may calculate an entailment score of 0.9 for the first extended prompt; an entailment score of 0.85 for the second extended prompt; an entailment score of 0.2 for the third extended prompt; an entailment score of 0.45 for the fourth extended prompt; and an entailment score of 0.75 for the fifth extended prompt. In this example, the entailment scores for the first, second, and fifth extended prompts may be relatively high because these extended prompts provide clear, accurate examples of "domestic robot training environments" with suitable "object(s) to pick up", i.e., they successfully entail the base prompt. However, the entailment scores for the third and fourth extended prompts may be relatively low because e.g., the third extended prompt relates to a "warehouse" (which is not a suitable training environment for a "domestic" robot) and because e.g., the fourth extended prompt provides examples of heavy furniture (which are not suitable objects for a "domestic robot" to "pick up"), i.e., they do not successfully entail the base prompt.

Extended prompts with an entailment score above the threshold entailment score, which is 0.7 in this scenario but may be higher or lower in other scenarios, can be retained in the subset of extended prompts. Hence, the first, second, and fifth extended prompts are included in the subset of extended prompts, whilst the third and fourth extended prompts are not included in the subset of extended prompts (and e.g., can be removed from the response generation pipeline at this stage). It will be appreciated that, in various implementations, the entailment scores, threshold entailment score, and subset of extended prompts are not rendered (e.g., visually and/or audibly) for presentation to the user at the client device, such that they are not perceivable to the user.

Figure 4D:
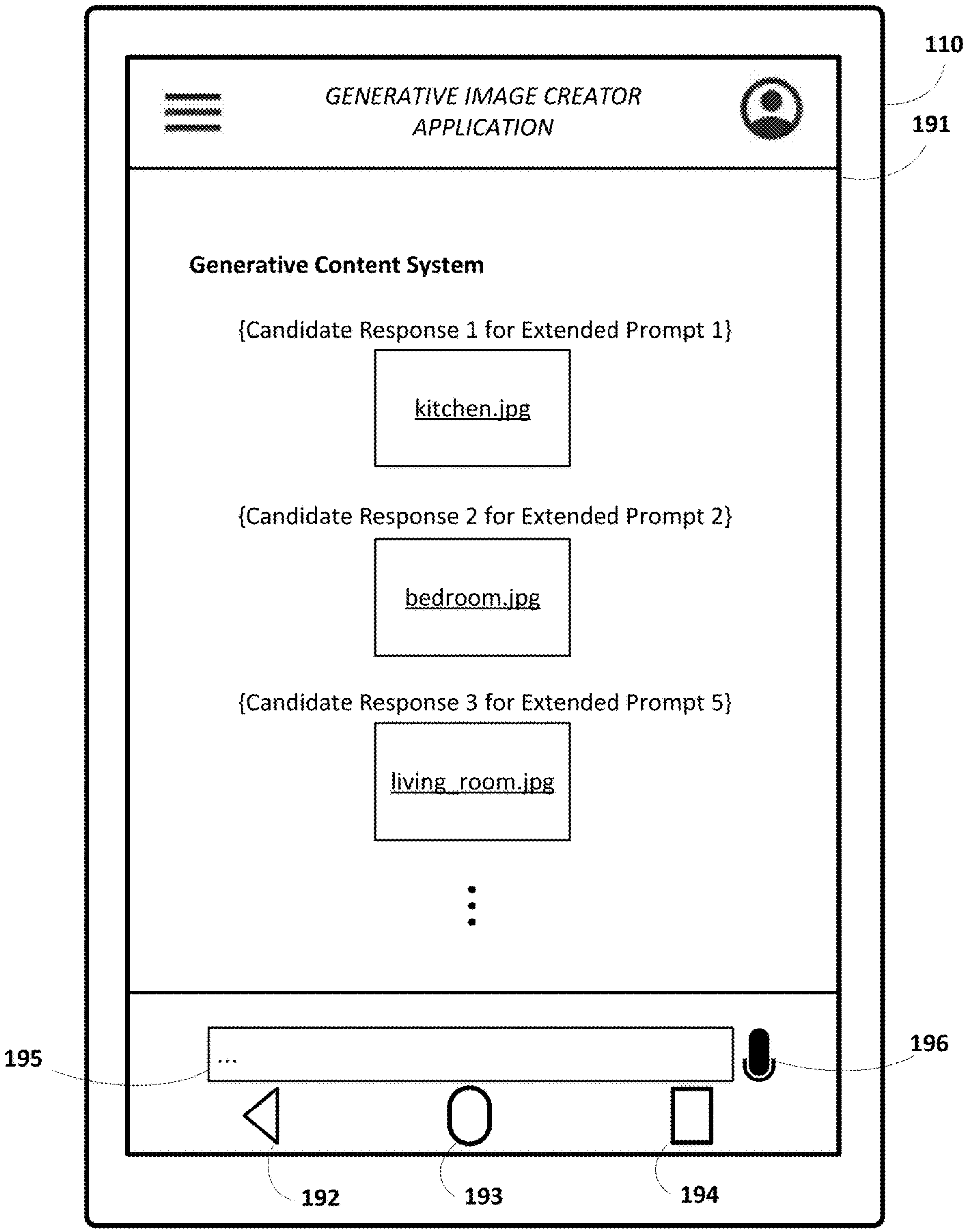

Referring specifically to FIG. 4D, the generative content system 120 can utilize an image generation model (i.e., a second GM) to generate a responsive image (i.e., a candidate response) for each of the extended prompts in the subset of extended prompts. For example, using each of the respective extended prompts as a prompt, or as part of a prompt for the image generation model, a first candidate response/image of "kitchen. jpg"; a second candidate response/image of "bedroom. jpg", and a third candidate response/image of "living_room. jpg" may be generated. It will be appreciated that, in various implementations, the candidate responses are not rendered (e.g., visually and/or audibly) for presentation to the user at the client device, such that they are not perceivable to the user.

Figure 4E:
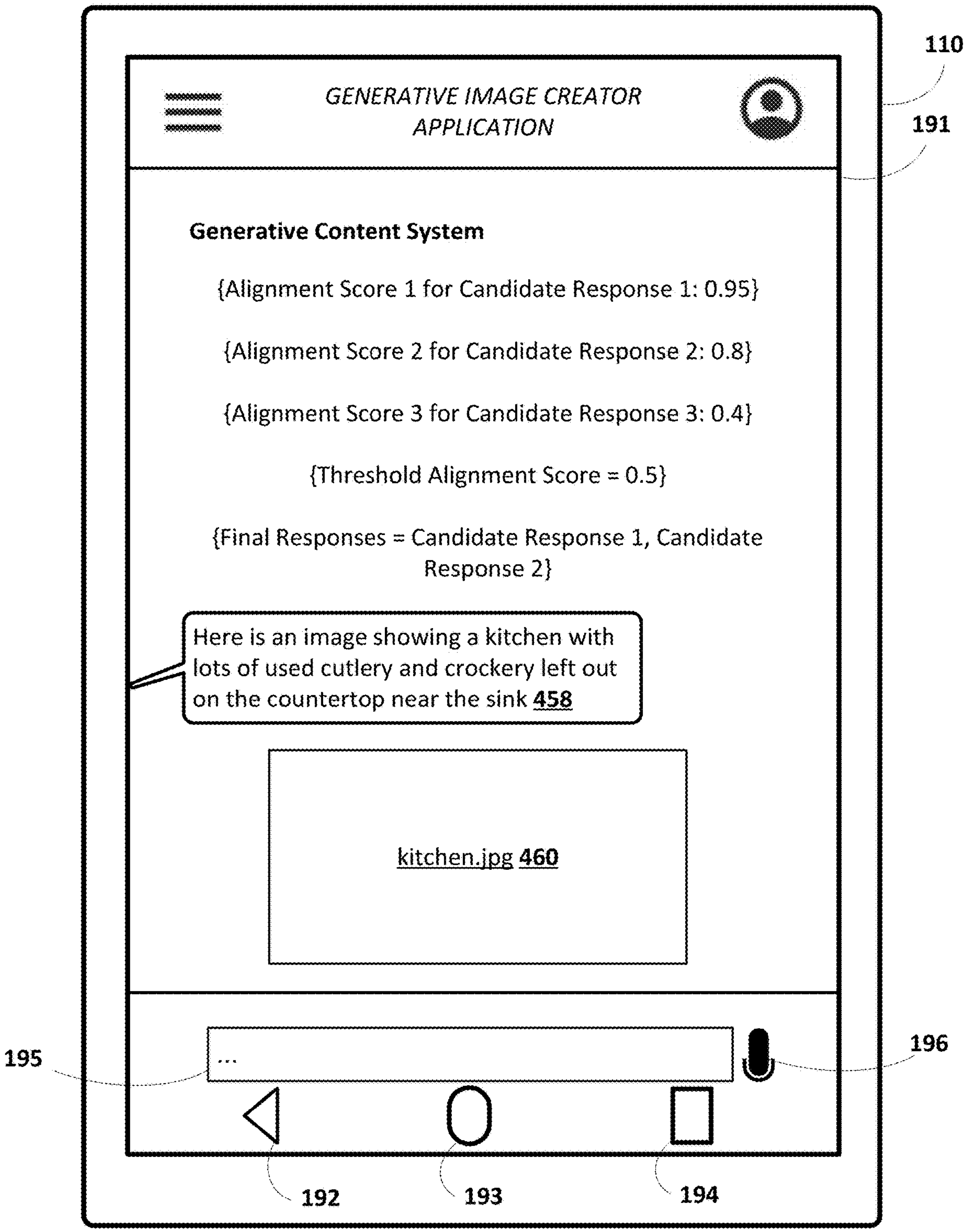

Referring specifically to FIG. 4E, the generative content system 120 can utilize a visual natural language inferencing model (e.g., a second evaluation model) to filter the three candidate responses. For example, the second evaluation model can calculate an alignment score for each of the candidate responses which scores how successfully the candidate response aligns with the base prompt. (Additionally, or alternatively, the alignment score could score how successfully the candidate response aligns with the respective extended prompt). For example, the second evaluation model may calculate an alignment score of 0.95 for the first candidate response; an alignment score of 0.8 for the second candidate response; and an alignment score of 0.4 for the third candidate response. In this example, the alignment scores for the first and second candidate responses may be relatively high because these candidate responses provide clear, accurate images of "domestic robot training environments" with suitable "object(s) to pick up", i.e., they successfully align with the base prompt. However, the alignment score for the third candidate response may be relatively low because e.g., the generated image fails to clearly show any "object(s) to pick up", i.e., it does not successfully align with the base prompt. These kinds of failures can arise e.g., due to deficiencies or biases in the training or implementation of the image generation model, which can be mitigated using the techniques described herein. For instance, by using a separate second evaluation model to remove the poorly aligned third candidate response from the pipeline, the unsuccessful third candidate response is not rendered at the client device, saving computational and/or network resources.

Candidate responses with an alignment score above the threshold alignment score, which is 0.5 in this scenario but may be higher or lower in other scenarios, can be retained in the one or more final responses which are responsive to the NL input. Hence, the first and second candidate responses are included in the final responses, whilst the third candidate response is not included in the final responses (and e.g., can be removed from the pipeline at this stage). It will be appreciated that, in various implementations, the alignment scores, threshold alignment score, and final responses are not rendered (e.g., visually and/or audibly) for presentation to the user at the client device, such that they are not perceivable to the user.

The first image, having the highest alignment score, can be provided to the client device 110 (e.g., from a server that implements the image generation model, via the generative content system 120, etc.). The client device can render the image for display at the client device as output 460 on display 191. Optionally the client device could also render textual output 458 captioning or otherwise explaining the output 460, e.g., "Here is an image showing a kitchen with lots of used cutlery and crockery left out on the countertop near the sink", based on the respective extended prompt. As explained herein, the second image, having the next highest alignment score, could be provided to the client device 110 and stored in a local memory or cache. Should the user request (e.g., via a further user input) an alternative response to their original NL input, this second image can be rendered for display with minimal latency.

Although FIGS. 4A-4E are described with respect to a request for an image generation task received at a generative image creator application, it should be understood that this is for the sake of example and is not meant to be limiting. In additional or alternative implementations, the request can be for a video generation task, an audio generation task, and/or a text generation task, and the application can correspondingly be a generative video creator application, a generative audio creator application and/or a generative text creator application.

Figure 5:
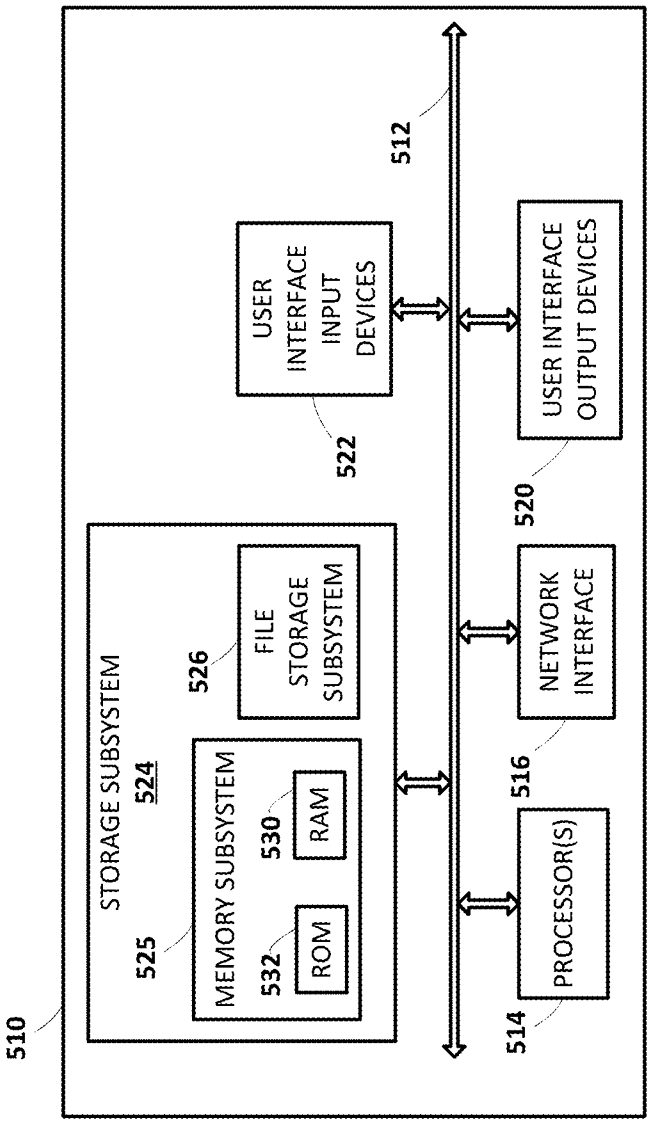
FIG. 5 depicts an example architecture of a computing device, in accordance with various implementations.

Turning now to FIG. 5, a block diagram of an example computing device 510 that may optionally be utilized to perform one or more aspects of techniques described herein is depicted. In some implementations, one or more of a client device (e.g., client device 110), generative content system component(s) or other cloud-based software application component(s) (e.g., component(s) of generative content system 120), and/or other component(s) may comprise one or more components of the example computing device 510.

Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods disclosed herein, as well as to implement various components depicted in FIGS. 1 and 2.

These software modules are generally executed by processor 514 alone or in combination with other processors. Memory 525 used in the storage subsystem 524 can include a number of memories including a main random-access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem 512 may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes: receiving natural language (NL) input associated with a client device; and generating one or more responses that are responsive to the NL input. Generating the one or more responses that are responsive to the NL input includes: determining, based on the NL input, a base prompt; processing, using a first generative model (GM), first GM input to generate corresponding first GM output, the first GM input including the base prompt; determining, based on the corresponding first GM output, a plurality of extended prompts; obtaining, based on filtering the plurality of extended prompts, a subset of extended prompts; for each extended prompt of the subset of extended prompts: processing, using the first GM or a second GM, second GM input to generate corresponding second GM output, the second GM input including the respective extended prompt, and determining, based on the corresponding second GM output, a respective candidate response corresponding to the respective extended prompt; and obtaining, based on filtering the one or more candidate responses, the one or more responses that are responsive to the NL input.

These and other implementations of technology disclosed herein can optionally include one or more of the following features.

In some implementations, the method can further include: causing the client device to render at least one of the one or more responses that are responsive to the NL input. In some versions of those implementations, the one or more responses rendered by the client device can be primary responses, and the method can further include: causing the client device to cache, in a local memory of the client device, one or more secondary responses, wherein the secondary responses can include at least one of the one or more responses that are responsive to the NL input other than the primary responses; and responsive to an input from a user of the client device, causing the client device to further render at least one of the secondary responses.

In some additional or alternative implementations, the first GM can be a first large language model (LLM).

In some additional or alternative implementations, the second GM can be an image generation model, and each of the one or more candidate responses can be an image. In some implementations, the second GM can be a video generation model, and each of the one or more candidate responses can be a portion of video data. In some implementations, the second GM can be an audio generation model, and each of the one or more candidate responses can be a portion of audio data. In some implementations, the second GM can be a second LLM, and each of the one or more candidate responses can be a portion of text data.

In some additional or alternative implementations, the first GM and the second GM can be components of an end-to-end GM.

In some additional or alternative implementations, the plurality of extended prompts can include $N_1$ extended prompts, wherein $N_1$ can be a positive integer. In some versions of these implementations, $N_1$ can be a fixed integer. In some versions of these implementations, $N_1$ can be a dynamic integer that is based on one or more of: a token limit for the first GM, a temporal constraint for the first GM, and/or a computational constraint for the first GM.

In some additional or alternative implementations, determining the base prompt can include: processing, using the first GM, the second GM, or a third GM, third GM input to generate corresponding third GM output, the third GM input including the NL input; and determining, based on the corresponding third GM output, the base prompt. In some versions of these implementations, the third GM can be a third LLM. In some additional or alternative versions of these implementations, the third GM can be a component of an end-to-end GM which can also include the first GM and/or the second GM.

In some additional or alternative implementations, the method can further include: filtering, using a first evaluation model, the plurality of extended prompts. Filtering the plurality of extended prompts can include: for each extended prompt of the plurality of extended prompts: processing, using the first evaluation model, first evaluation input to generate corresponding first evaluation output, the first evaluation input including the respective extended prompt and the base prompt, and determining, based on the corresponding first evaluation output, a respective entailment score corresponding to the respective extended prompt; and determining, based on the respective entailment score, whether the respective extended prompt is to be included in the subset of extended prompts.

In some versions of these implementations, determining whether the respective extended prompt is to be included in the subset of extended prompts can include: comparing the respective entailment score to a threshold entailment score; responsive to the respective entailment score being greater than or equal to the threshold entailment score, determining that the respective extended prompt is to be included in the subset of extended prompts; and responsive to the respective entailment score being less than the threshold entailment score, determining that the respective extended prompt is not to be included in the subset of extended prompts. In some versions of these implementations, determining whether the respective extended prompt is to be included in the subset of extended prompts can include: for each extended prompt of the plurality of extended prompts: ranking the respective extended prompt based on the respective entailment score corresponding to the respective extended prompt; and determining that the $N_2$ highest ranking extended prompts of the plurality of extended prompts are to be included in the subset of extended prompts, wherein $N_2$ can be a positive fixed integer. In some additional or alternative versions of these implementations, the first evaluation model can be a component of an end-to-end GM which can also include the first GM and/or the second GM.

In some additional or alternative implementations, the method can further include: filtering, using a second evaluation model, the one or more candidate responses. Filtering the one or more candidate responses can include: for each candidate response of the one or more candidate responses: processing, using the second evaluation model, second evaluation input to generate corresponding second evaluation output, the second evaluation input including the respective candidate response as well as the base prompt and/or the respective extended prompt which corresponds to the respective candidate response, and determining, based on the corresponding second evaluation output, a respective alignment score corresponding to the respective candidate response; and determining, based on the respective alignment score, whether the respective candidate response is to be included in the one or more responses that are responsive to the NL input.

In some versions of these implementations, determining whether the respective candidate response is to be included in the one or more responses that are responsive to the NL input can include: comparing the respective alignment score to a threshold alignment score; responsive to the respective alignment score being greater than or equal to the threshold alignment score, determining that the respective candidate response is to be included in the one or more responses that are responsive to the NL input; and responsive to the respective alignment score being less than the threshold alignment score, determining that the respective candidate response is not to be included in the one or more responses that are responsive to the NL input. In some versions of these implementations, determining whether the respective candidate response is to be included in the one or more responses that are responsive to the NL input can include: for each candidate response of the one or more candidate responses: ranking the respective candidate response based on the respective alignment score corresponding to the respective candidate response; and determining that the $N_3$ highest ranking candidate responses of the one or more candidate responses are to be included in the one or more responses that are responsive to the NL input, wherein $N_3$ can be a positive fixed integer. In some additional or alternative versions of these implementations, the second evaluation model can be a component of an end-to-end GM which can also include the first GM and/or the second GM.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more computer-readable storage media (e.g., transitory and/or non-transitory) storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:

receiving natural language (NL) input associated with a client device; and generating one or more responses that are responsive to the NL input, wherein generating the one or more responses that are responsive to the NL input comprises:

determining, based on the NL input, a base prompt;

processing, using a first generative model (GM), first GM input to generate corresponding first GM output, the first GM input comprising the base prompt;

determining, based on the corresponding first GM output, a plurality of extended prompts;

obtaining, based on filtering the plurality of extended prompts, a subset of extended prompts;

for each extended prompt of the subset of extended prompts:

processing, using the first GM or a second GM, second GM input to generate corresponding second GM output, the second GM input comprising the respective extended prompt, and determining, based on the corresponding second GM output, a respective candidate response corresponding to the respective extended prompt; and obtaining, based on filtering the one or more candidate responses, the one or more responses that are responsive to the NL input.

2. The method of claim 1, further comprising:

causing the client device to render at least one of the one or more responses that are responsive to the NL input.

3. The method of claim 2, wherein the one or more responses rendered by the client device are primary responses, the method further comprising:

causing the client device to cache, in a local memory of the client device, one or more secondary responses, wherein the secondary responses comprise at least one of the one or more responses that are responsive to the NL input other than the primary responses; and responsive to an input from a user of the client device, causing the client device to further render at least one of the secondary responses.

4. The method of claim 1, wherein the first GM is a first large language model (LLM).

5. The method of claim 4, wherein the second GM is an image generation model, and wherein each of the one or more candidate responses is an image.

6. The method of claim 4, wherein:

the second GM is a video generation model, and wherein each of the one or more candidate responses is a portion of video data; or the second GM is an audio generation model, and wherein each of the one or more candidate responses is a portion of audio data; or the second GM is a second LLM, and wherein each of the one or more candidate responses is a portion of text data.

7. The method of claim 1, wherein the first GM and the second GM are components of an end-to-end GM.

8. The method of claim 1, wherein the plurality of extended prompts includes $N_1$ extended prompts, wherein $N_1$ is a positive integer.

9. The method of claim 8, wherein $N_1$ is a fixed integer.

10. The method of claim 8, wherein $N_1$ is a dynamic integer that is based on one or more of: a token limit for the first GM, a temporal constraint for the first GM, and/or a computational constraint for the first GM.

11. The method of claim 1, wherein determining the base prompt comprises:

processing, using the first GM, the second GM, or a third GM, third GM input to generate corresponding third GM output, the third GM input comprising the NL input; and determining, based on the corresponding third GM output, the base prompt.

12. The method of claim 11, wherein the third GM is a third LLM.

13. The method of claim 11, wherein the third GM is a component of an end-to-end GM which also comprises the first GM and/or the second GM.

14. The method of claim 1, further comprising:

filtering, using a first evaluation model, the plurality of extended prompts, wherein filtering the plurality of extended prompts comprises:

for each extended prompt of the plurality of extended prompts:

processing, using the first evaluation model, first evaluation input to generate corresponding first evaluation output, the first evaluation input comprising the respective extended prompt and the base prompt, and determining, based on the corresponding first evaluation output, a respective entailment score corresponding to the respective extended prompt; and determining, based on the respective entailment score, whether the respective extended prompt is to be included in the subset of extended prompts.

15. The method of claim 14, wherein determining whether the respective extended prompt is to be included in the subset of extended prompts comprises:

comparing the respective entailment score to a threshold entailment score;

responsive to the respective entailment score being greater than or equal to the threshold entailment score, determining that the respective extended prompt is to be included in the subset of extended prompts; and responsive to the respective entailment score being less than the threshold entailment score, determining that the respective extended prompt is not to be included in the subset of extended prompts.

16. The method of claim 14, wherein determining whether the respective extended prompt is to be included in the subset of extended prompts comprises:

for each extended prompt of the plurality of extended prompts:

ranking the respective extended prompt based on the respective entailment score corresponding to the respective extended prompt; and determining that the $N_2$ highest ranking extended prompts of the plurality of extended prompts are to be included in the subset of extended prompts, wherein $N_2$ is a positive fixed integer.

17. The method of claim 14, wherein the first evaluation model is a component of an end-to-end GM which also comprises the first GM and/or the second GM.

18. The method of claim 1, further comprising:

filtering, using a second evaluation model, the one or more candidate responses, wherein filtering the one or more candidate responses comprises:

for each candidate response of the one or more candidate responses:

processing, using the second evaluation model, second evaluation input to generate corresponding second evaluation output, the second evaluation input comprising the respective candidate response as well as the base prompt and/or the respective extended prompt which corresponds to the respective candidate response, and determining, based on the corresponding second evaluation output, a respective alignment score corresponding to the respective candidate response; and determining, based on the respective alignment score, whether the respective candidate response is to be included in the one or more responses that are responsive to the NL input.

19. A system comprising:

at least one processor; and memory storing instructions that, when executed by the at least one processor, cause the at least one processor to be operable to:

receive natural language (NL) input associated with a client device; and generate one or more responses that are responsive to the NL input, wherein the instructions to generate the one or more responses that are responsive to the NL input comprise instructions to:

determine, based on the NL input, a base prompt;

process, using a first generative model (GM), first GM input to generate corresponding first GM output, the first GM input comprising the base prompt;

determine, based on the corresponding first GM output, a plurality of extended prompts;

obtain, based on filtering the plurality of extended prompts, a subset of extended prompts;

for each extended prompt of the subset of extended prompts:

process, using the first GM or a second GM, second GM input to generate corresponding second GM output, the second GM input comprising the respective extended prompt, and determine, based on the corresponding second GM output, a respective candidate response corresponding to the respective extended prompt; and obtain, based on filtering the one or more candidate responses, the one or more responses that are responsive to the NL input.

20. A non-transitory computer-readable storage medium storing instructions that, when executed by at least one processor, cause the at least one processor to be operable to:

receive natural language (NL) input associated with a client device; and generate one or more responses that are responsive to the NL input, wherein, in generating the one or more responses that are responsive to the NL input, the at least one processor is operable to:

determine, based on the NL input, a base prompt;

process, using a first generative model (GM), first GM input to generate corresponding first GM output, the first GM input comprising the base prompt;

determine, based on the corresponding first GM output, a plurality of extended prompts;

obtain, based on filtering the plurality of extended prompts, a subset of extended prompts;

for each extended prompt of the subset of extended prompts:

process, using the first GM or a second GM, second GM input to generate corresponding second GM output, the second GM input comprising the respective extended prompt, and determine, based on the corresponding second GM output, a respective candidate response corresponding to the respective extended prompt; and obtain, based on filtering the one or more candidate responses, the one or more responses that are responsive to the NL input.

* * * * *